US012806789B2

(12) United States Patent
Sano et al.

(10) Patent No.: US 12,806,789 B2
(45) Date of Patent: Nov. 24, 2026

(54) MERCHANDISE MOVEMENT DEVICE, MERCHANDISE MOVEMENT SYSTEM, AND METHOD FOR CONTROLLING MERCHANDISE MOVEMENT DEVICE

(71) Applicant: TELEXISTENCE INC., Tokyo (JP)

(72) Inventors: Genki Sano, Tokyo (JP); Hiroshi Yamaura, Tokyo (JP); Nathan Quinn, Tokyo (JP); Joni Vaeaetaeinen, Tokyo (JP); Pavel Savkin, Tokyo (JP)

(73) Assignee: Telexistence Inc., Tokyo (JP)

( * ) Notice: Subject to any disclaimer, the term of this patent is extended or adjusted under 35 U.S.C. 154(b) by 154 days.

(21) Appl. No.: 18/683,828

(22) PCT Filed: Aug. 19, 2022

(86) PCT No.: PCT/JP2022/031303

§ 371 (c)(1),
(2) Date: Feb. 15, 2024

(87) PCT Pub. No.: WO2023/022214

PCT Pub. Date: Feb. 23, 2023

(65) Prior Publication Data

US 2024/0351216 A1 Oct. 24, 2024

(30) Foreign Application Priority Data

Aug. 20, 2021 (JP) ................................ 2021-135009
Oct. 12, 2021 (JP) ................................ 2021-167494

(51) Int. Cl.
*B25J 9/16* (2006.01)
*G06Q 10/087* (2023.01)
(Continued)

(52) U.S. Cl.
CPC .......... *B25J 9/1697* (2013.01); *G06Q 10/087* (2013.01); *G06T 7/50* (2017.01);
(Continued)

(58) Field of Classification Search
CPC ...... A47F 3/00; A47F 5/00; A47F 7/28; B25J 9/1697; B25J 13/08; B65G 1/137;
(Continued)

(56) References Cited

U.S. PATENT DOCUMENTS

2017/0225330 A1* 8/2017 Wagner .................. B25J 9/1664
2017/0286773 A1 10/2017 Skaff et al.
(Continued)

FOREIGN PATENT DOCUMENTS

CN 211109278 U 7/2020
JP H06-031552 A 2/1994
(Continued)

OTHER PUBLICATIONS

English Machine Translation of JP2020151349A, Accessed Oct. 22, 2025.*
(Continued)

*Primary Examiner* — Blake A Wood
(74) *Attorney, Agent, or Firm* — MEAGHER EMANUEL LAKS GOLDBERG & LIAO. LLP

(57) ABSTRACT

According to one embodiment of the present disclosure, a product transfer apparatus is provided. The product transfer apparatus includes a holder unit for holding a product, an arm unit for moving the holder unit to a stock shelf and a display shelf, a first image capture unit for capturing an image of the display shelf, a second image capture unit for capturing an image of the stock shelf, and a control unit for controlling operation of the arm unit, the holder unit, and the first and second image capture units. The control unit is configured to identify a replenishment target product as a product required to be replenished on the display shelf, based on display shelf capture image data generated by image capturing of the display shelf by the first image capture unit, and identify a position of a stock product
(Continued)

corresponding to the replenishment target product in the stock shelf capture image data, based on shelf capture image data generated by image capturing of the stock shelf by the second image capture unit.

15 Claims, 19 Drawing Sheets

(51) Int. Cl.

| | |
|---|---|
| ***G06T 7/50*** | (2017.01) |
| ***G06T 7/70*** | (2017.01) |
| ***G06V 20/60*** | (2022.01) |
| ***H04N 23/90*** | (2023.01) |

(52) U.S. Cl.
CPC ................ *G06T 7/70* (2017.01); *G06V 20/60* (2022.01); *H04N 23/90* (2023.01)

(58) Field of Classification Search
CPC ........... G06Q 10/087; G06T 7/50; G06T 7/70; G06V 20/60; H05N 23/90
See application file for complete search history.

(56) References Cited

U.S. PATENT DOCUMENTS

| | | | | |
|---|---|---|---|---|
| 2018/0060803 | A1* | 3/2018 | Cheruku | G06V 20/52 |
| 2018/0247264 | A1* | 8/2018 | Taylor | G06Q 10/047 |
| 2019/0080278 | A1* | 3/2019 | Sugahara | B25J 18/02 |
| 2020/0005225 | A1 | 1/2020 | Chaubard | |

FOREIGN PATENT DOCUMENTS

| | | | | | |
|---|---|---|---|---|---|
| JP | 9-263307 | A | | 10/1997 | |
| JP | 2018-110755 | A | | 7/2018 | |
| JP | 2020151349 | A | * | 9/2020 | A47F 3/04 |
| JP | 2021-095250 | A | | 6/2021 | |
| JP | 2022-21602 | A | | 2/2022 | |
| KR | 20170094103 | A | * | 8/2017 | G06T 7/62 |
| WO | 2020/195887 | A | | 10/2020 | |

OTHER PUBLICATIONS

English Machine Translation of KR20170094103A, Accessed Oct. 22, 2025.*
English Machine Translation of JP2018110755A, Accessed Oct. 22, 2025.*
International Search Report from the priority application PCT/JP2022/031303, mailed on Oct. 11, 2022.
Written Opinion from the priority application PCT/JP2022/031303, mailed on Oct. 11, 2022.
The first Office Action from the corresponding CN application 202280056801.2 mailed on Dec. 17, 2025, with English machine translation attached.
Decision of rejection from the corresponding CN application 202280056801.2 mailed on Dec. 17, 2025 with English machine translation attached.
Office Action from the corresponding JP application 2023-542449 mailed on Sept. 7, 2026, with English machine translation attached.

* cited by examiner

MERCHANDISE MOVEMENT DEVICE, MERCHANDISE MOVEMENT SYSTEM, AND METHOD FOR CONTROLLING MERCHANDISE MOVEMENT DEVICE

TECHNICAL FIELD

The present disclosure relates to a product transfer apparatus, a product transfer system, and a method of controlling the product transfer apparatus.

BACKGROUND

Conventionally, products of PET bottled beverages and canned beverages are placed on product display shelves, and sold in stores such as convenience stores. When products on a product display shelf becomes fewer, a store employee moves products from a replenishment shelf in a backyard space to the product display shelf to replenish the product display shelf.

JP2018-110755 discloses a product display system for unmanned replenishment of products to reduce work labors. This product display system has a three-dimensional shape measuring instrument and a robot having multiple joints.

SUMMARY

In stores such as convenience stores, product display shelves and stock shelves are often placed on both sides of an aisle. The product display system of JP2018-110755 replenishes products by recognizing positions of the products using the single three-dimensional shape measuring instrument. This product display system can be used when the product display shelves and stock shelves are provided on one (same) side of the aisle. However, the product display system cannot replenish products when the product display shelves and stock shelves are provided on both sides of the aisle.

The present disclosure has been made taking these points into account, and an object of the present disclosure is to provide a product transfer apparatus, a product transfer system, and a method of controlling the product transfer apparatus which make it possible to perform replenishing operation of products efficiently even in a layout where a product display shelf and a stock shelf are provided on both sides of an aisle.

According to an aspect of the present disclosure, a product transfer apparatus for moving a product placed on a stock shelf to a display shelf which is different from the stock shelf is provided. The product transfer apparatus includes a holder unit for holding a product, an arm unit for moving the holder unit to a stock shelf and a display shelf, a first image capture unit for capturing an image of the display shelf, a second image capture unit for capturing an image of the stock shelf, and a control unit for controlling operation of the arm unit, the holder unit, and the first and second image capture units. The control unit is configured to identify a replenishment target product as a product required to be replenished on the display shelf, based on display shelf capture image data generated by image capturing of the display shelf by the first image capture unit, and identify a position of a stock product corresponding to the replenishment target product in the stock shelf capture image data, based on stock shelf capture image data generated by image capturing of the stock shelf by the second image capture unit.

In this specification, "capture image data" obtained by image capturing by an image capturing unit may include only capture images, such as RGB images, only data of distance to a target object, or a combination of the capture images and the distance data.

According to the present disclosure, it is possible to provide a product transfer apparatus, a product transfer system, and a method of controlling the product transfer apparatus which make it possible to efficiently perform replenishment operation of products.

DETAILED DESCRIPTION

First Embodiment

Figure 1:
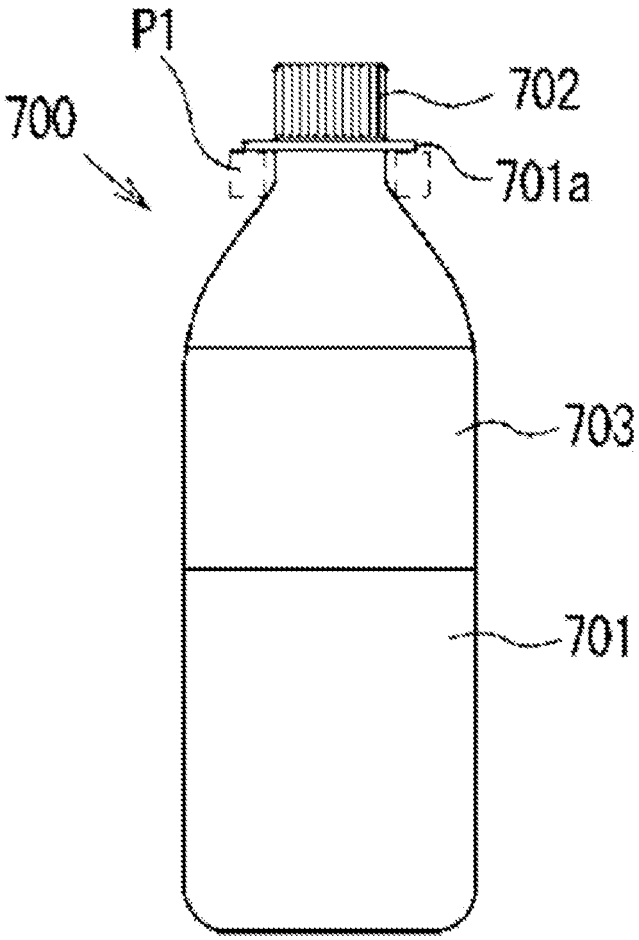
FIG. 1 is a view showing a beverage in a container having a cap member as a product.

Hereinafter, embodiments of the present disclosure will be described with reference to the drawings. Among components of the embodiments described below, components not described in the independent claims which represent the highest level concept are optional components. In the accompanying drawings, substantially identical components are labeled with the same or corresponding reference numerals. The description of substantially identical components may not be given repeatedly, or may be simplified.

Figure 2:
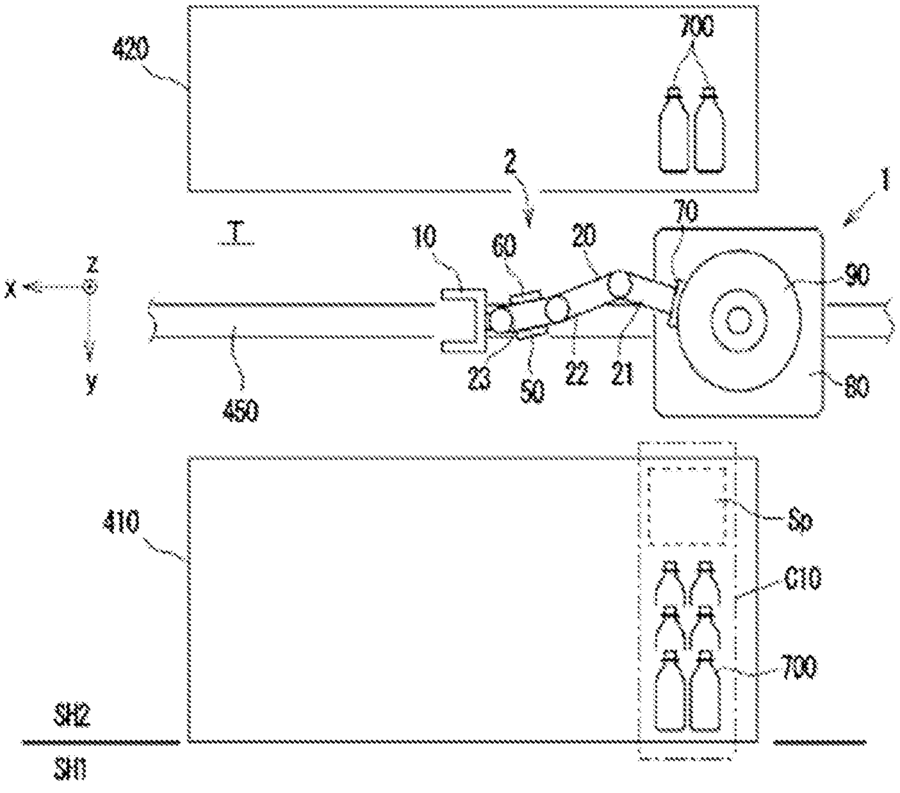
FIG. 2 is a plan view schematically showing structure in a store where a product transfer apparatus is used, and the product transfer apparatus disposed in the store.
Figure 3:
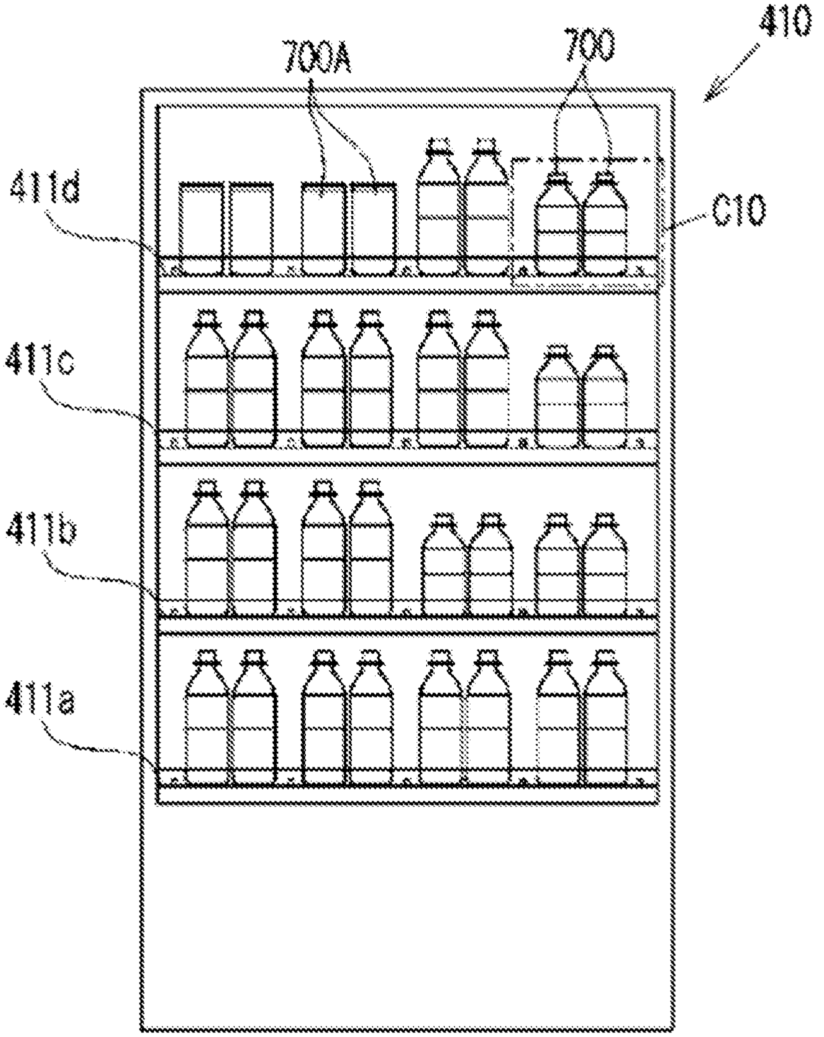
FIG. 3 is a view showing a product display shelf viewed from the front side.
Figure 4:
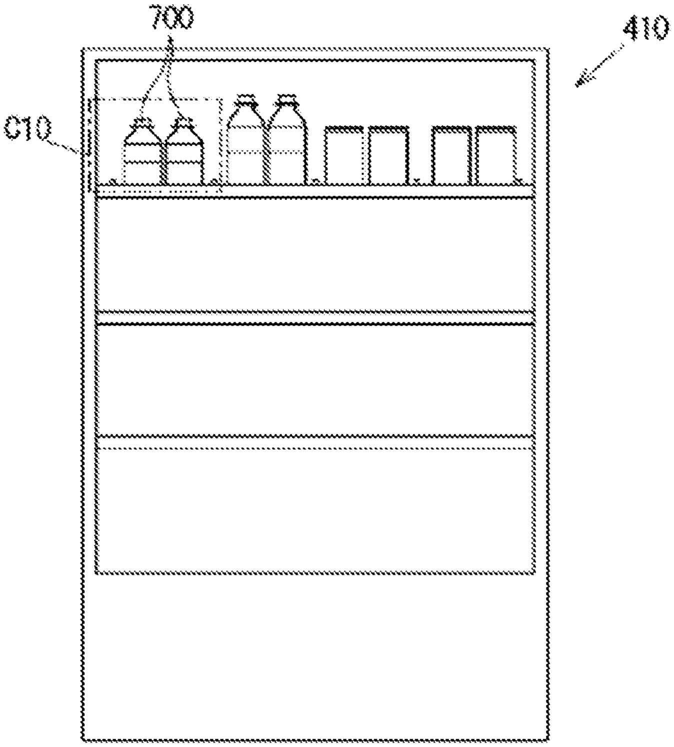
FIG. 4 is a view showing the product display shelf viewed from the back side.
Figure 5:
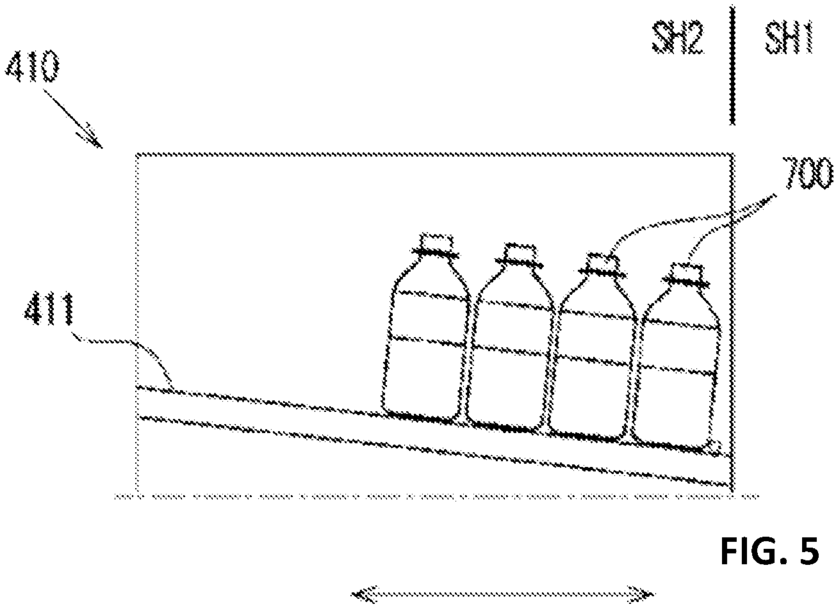
FIG. 5 is a side view showing a shelf plate of the product display shelf and products disposed on the shelf plate.
Figure 6:
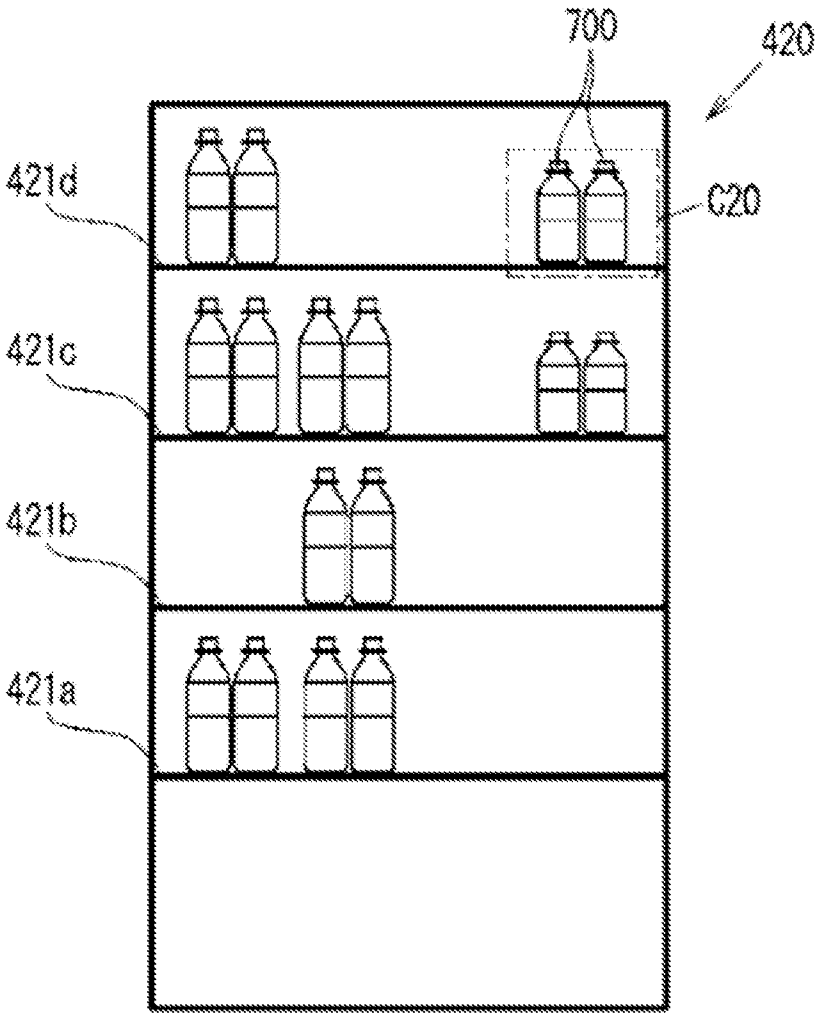
FIG. 6 is a view showing a stock shelf viewed from the front side.

FIGS. 1 to 6 are view for illustrating an overview of a product transfer system for displaying beverage products. FIG. 1 is a view showing a beverage in a container having a cap member as a product. FIG. 2 is a plan view schematically showing structure in a store where a product transfer apparatus 1 is used, and the product transfer apparatus 1 disposed in the store. FIG. 3 is a view showing a product display shelf 410 viewed from the front side. FIG. 4 is a view showing the product display shelf 410 viewed from the back side. FIG. 5 is a side view showing a shelf plate of the product display shelf 410 and products disposed on the shelf plate. FIG. 6 is a view showing a stock shelf viewed from the front side.

<Regarding Product 700>

Firstly, a product 700 held by the product transfer apparatus 1 according to the embodiment will be described with reference to FIG. 1. The product 700 in FIG. 1 is a beverage contained in a container such as a PET bottle, a bottle or a can. The product 700 includes a container body 701 and a cap member 702. The container body 701 is formed of material such as resin material, glass or metal. The container body 701 may be translucent, or may not be translucent. The cap member 702 is attached to a drinking spout portion (not shown) of the container body 701. The cap member 702 is a member for sealing the container body 701, and is made of material which is not translucent, for example. A circular flange 701*a* is formed on the container body 701 below the cap member 702.

A product label 703 is attached to a side surface of the container body 701. The product 700 may be a so-called label-less PET bottle beverage. The label-less PET bottle beverage does not have any product label 703, but instead, a relatively small label (not shown) is attached to the PET bottle beverage. Products include, in addition to the product 700 with the cap member 702, a product 700A in a container without any cap member (see, for example, FIG. 3). The container of the product 700A is a cylindrical can, for example. In this specification, the product 700 with the cap member 702 and the product 700A without any cap member may be referred to as the "product 700" without any special distinction.

<Store Layout Configuration>

As shown in FIG. 2, the store has an in-store space (SH1) and a backyard space (SH2). The in-store space SH1 is a space where customers select and purchase products. The backyard space SH2 is a space where product stocks are stored. The store is provided with the product display shelf 410, a stock shelf 420, an aisle T, a rail 450, and the product transfer apparatus 1.

As shown in FIGS. 3 and 5, the product display shelf 410 has a plurality of shelf plates 411*a* to 411*d* (also simply referred to as shelf plates 411). As shown in FIG. 3, the plurality of shelf plates 411*a* to 411*d* are arranged in the height direction. A plurality of types of products 700 are arranged on the shelf plates 411. Products 700 of the same type may be arranged in two or three rows, or only in one row.

The front side of the product display shelf 410 faces the in-store space SH1. So, customers can take products 700 from the front side. The back side of the product display shelf 410 faces the backyard space SH2. So, a store employee or the product transfer apparatus 1 can replenish the product display shelf 410 with the products 700. Although not shown in the drawings, doors may be provided on the front and back sides of the product display shelf 410.

As shown in FIG. 5, the shelf plate 411 is inclined such that the front side gets lower relative to the back side. As a result, when a customer takes a product 700 from the front side, other products 700 arranged behind the product 700 slide on the shelf plate 411, and move toward the front side.

As shown in FIG. 2, the rail 450 has a straight shape, and is placed along the aisle T. The rail 450 extends straight in parallel to the lateral direction of the product display shelf 410 and the stock shelf 420.

The stock shelf 420 is disposed in the backyard space SH2, to face the product display shelf 410 across the aisle T. The front side of the stock shelf 420 and the back side of the product display shelf 410 face each other. As shown in FIG. 6, the stock shelf 420 has a plurality of shelf plates 421*a* to 421*d* (also simply referred to as the shelf plate 421) disposed in the height direction. Products 700 to be replenished on the product display shelf 410 are placed on the shelf plate 421. The upper surface of the shelf plate 421 may be horizontal. Alternatively, the upper surface of the shelf plate 421 may be inclined like the shelf plate 411 of the product display shelf 410.

The products 700 are placed on the stock shelf 420 by a store employee, for example. After products 700 are delivered to the store, the store employee takes the products 700 out of cardboard boxes, etc., and arranges the products 700 at predetermined positions on the stock shelf 420.

Conventionally, when it becomes necessary to replenish products to the product display shelf 410, the store employee takes the products 700 from the stock shelf 420 and moves the products 700 to the product display shelf 410. In this embodiment, this replenishment of products can also be performed by the product transfer apparatus 1.

<Structure of Product Transfer Apparatus 1>

Figure 7:
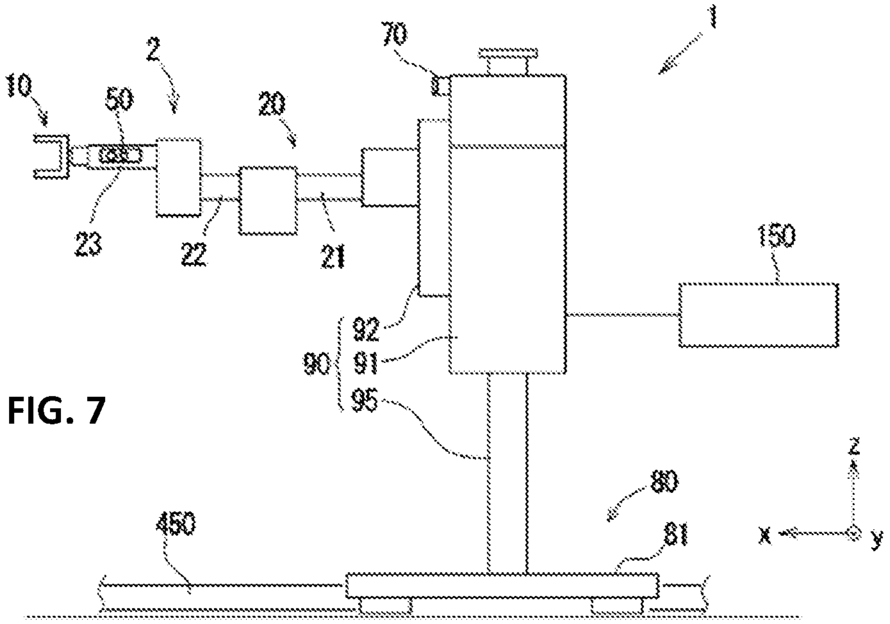
FIG. 7 is a side view schematically showing structure of a product transfer apparatus.
Figure 8:
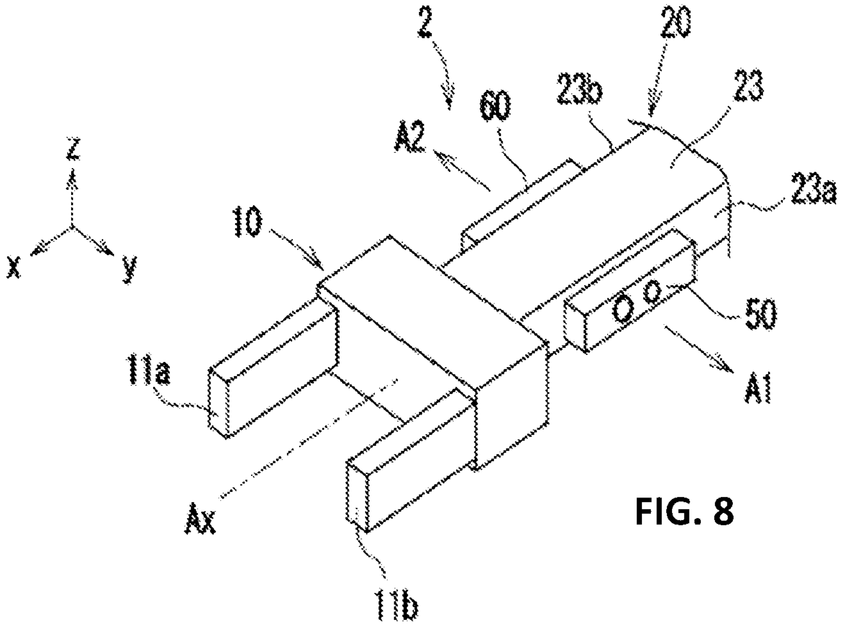
FIG. 8 is a perspective view showing structure around a front end of an arm unit of the product transfer apparatus.
Figure 9:
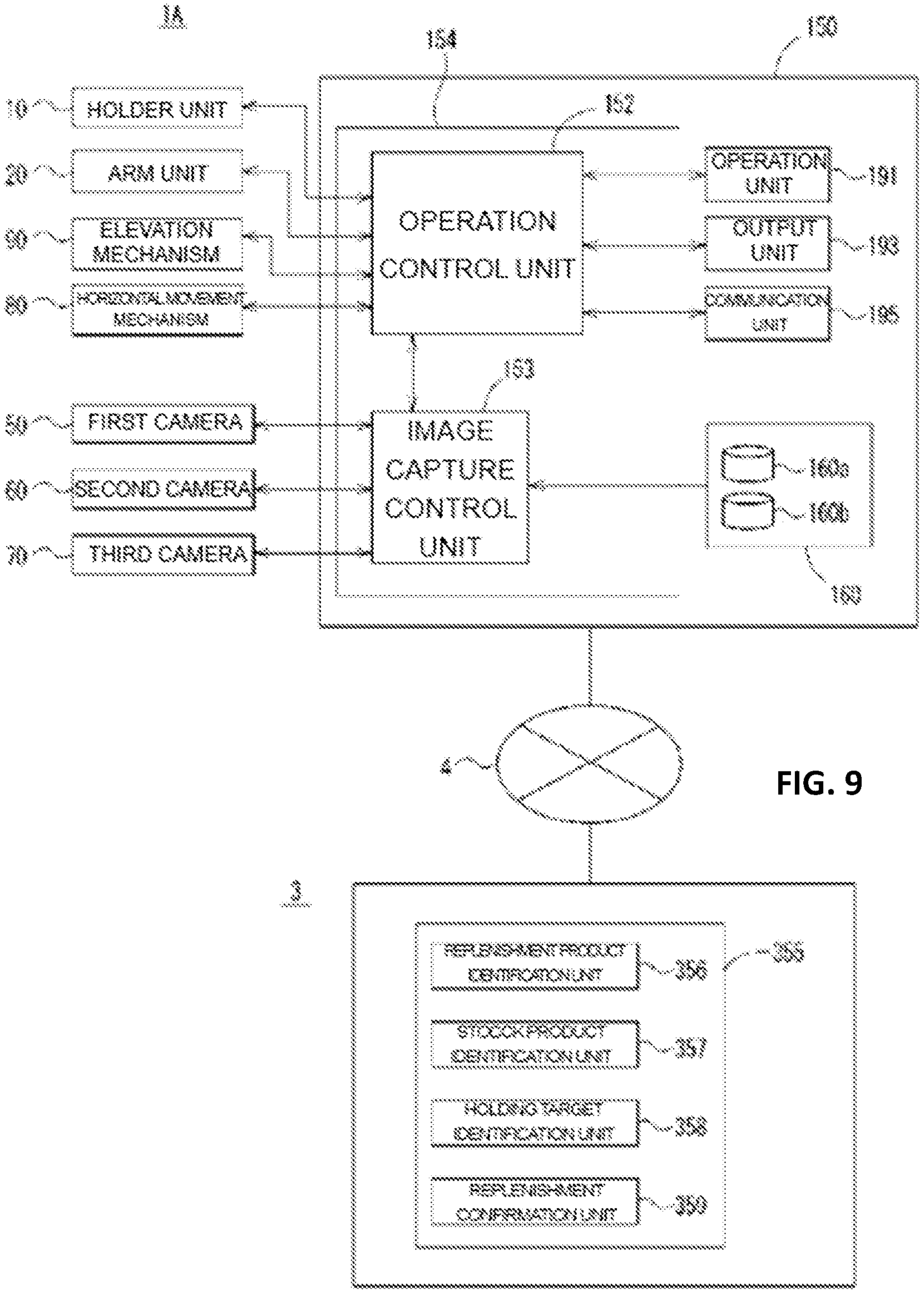
FIG. 9 is a block diagram showing structure of the product transfer apparatus.

Hereinafter, the product transfer apparatus 1 will be described with reference to FIGS. 2, and 7 to 9. FIG. 7 is a side view schematically showing structure of the product transfer apparatus 1. FIG. 8 is a perspective view showing structure around a front end of an arm unit of the product transfer apparatus 1. FIG. 9 is a block diagram showing structure of the product transfer apparatus 1.

The product transfer apparatus 1 includes a robot arm 2, a holder unit 10, an arm unit 20, a first camera 50, a second camera 60, a third camera 70, a horizontal movement mechanism 80, an elevation mechanism 90, and a control device 150. The holder unit 10 and the arm unit 20 form the robot arm 2.

The product transfer apparatus 1 is a robot movable along the rail 450 in a space between the product display shelf 410 and the stock shelf 420. The product transfer apparatus 1 holds an arbitrary product 700 in the stock shelf 420 by the holder unit 10, and thereafter, moves the product 700 held by the holder unit 10 to an arbitrary position of the product display shelf 410.

As shown in FIG. 8, the holder unit 10 includes a pair of holding members 11*a*, 11*b* for holding a target object, and a drive source (not shown). The holding members 11*a*, 11*b* are moved closer to each other and away from each other by the drive source. Operation of the holding members 11*a*, 11*b* is controlled by the control device 150. The control device 150 moves the holding member 11*a* and the holding member 11*b* closer to each other. Thus, the holder unit 10 can hold a target object. By moving the holding member 11*a* and the holding member 11*b* away from each other, the holder unit 10 can release the target object.

In the case of the product 700 as shown in FIG. 1, the holding members 11*a*, 11*b* are configured to have a shape which makes it possible to hold a holding position P1 near the cap member 702. The holding position P1 may be immediately below a flange 701*a*. Alternatively, the holding position P1 may be a part of the flange 701*a*. It should be noted that, also in the case of a container without any flange 701*a*, the holding position may be near the cap member 702.

The holding members 11*a*, 11*b* have a shape capable of holding a side surface of the product 700A without any cap member (see FIG. 3). As described above, the holding members 11*a*, 11*b* are configured to be able to hold various products 700 regardless of whether or not the cap member 702 is present.

The specific shape of the holding members 11*a*, 11*b* is not limited particularly. For example, holding members like three or more fingers may be provided. In addition to having a pair of holding members 11*a* and 11*b* as shown in FIG. 8, the holder unit 10 may be configured to hold the target object by adsorption or may be configured to hold a target object by using an adhesive force, a magnetic force, etc.

The arm unit 20 includes a plurality of link members 21, 22, 23, joints (not shown), and a drive source. The plurality of link members 21, 22, 23 form a multi-joint robot arm. For example, the multi-joint robot arm may be a 6-axis arm with degrees of freedom in a straight direction along each of the x, y, and z axis directions, and with degrees of freedom in each of the directions about the x, y, and z axes. The multi-joint robot arm may have any other mechanism, such as an orthogonal coordinate system robot arm, a polar coordinate system robot arm, a cylindrical coordinate system robot arm, or a SCARA robot arm. One end of the arm unit 20 is fixed to the elevation mechanism 90. The holder unit 10 is provided at a front end of the arm unit 20. Operation of the arm unit 20 is controlled by the control device 150.

The arm unit 20 can move the holder unit 10 toward the stock shelf 420 or toward the product display shelf 410 by moving respective link members 21, 22, 23. As described above, the orientation of the arm unit 20 is not fixed to a certain direction. However, for the sake of explanation, the direction in which the respective link members 21, 22, 23 are extended will be referred to as the extension direction Ax of the arm unit 20 (see FIG. 8). The arm unit 20 moves the holder unit 10 forward toward the product 700 to hold the product 700 (as described later with reference to FIG. 12). The extension direction Ax of the arm unit 20 corresponds to the forward direction of the holder unit 10 in holding operation.

<Structure of the First Camera 50 and the Second Camera 60>

The first camera 50 and the second camera 60 are disposed on both of the left and right sides of the arm unit 20. The first camera 50 as the first image capture unit is oriented in a first orientation A1 perpendicular to the extension direction Ax of the arm unit 20 (see FIG. 8). The first camera 50 is the first image capture unit, and is used to capture images of the product display shelf 410. The second camera 60 is a second image capture unit, and is oriented in a second orientation A2, opposite to the first orientation A1. The second camera 60 is used to capture images of the stock shelf 420.

The first camera 50 is mounted on a first side surface 23*a* of the arm unit 20 in this example. The second camera 60 is mounted on a second side surface 23*b* which is parallel to the first side surface 23*a* and opposite to the first side surface 23*a*. The first camera 50 and the second camera 60 are positioned in opposite orientations to each other. Therefore, the first camera 50 and the second camera 60 can capture images of the product display shelf 410 and the stock shelf 420, respectively, while keeping the arm unit 20 at the same posture.

The performance of the first camera 50 and the performance of the second camera 60 may be the same or different. However, for brevity of explanation, an example in which both cameras have the same performance will be described below. However, the purpose and conditions for capturing images of the product display shelf 410 are different from the purpose and conditions for capturing images of the stock shelf 420. It is a matter of course that cameras having different performances may be used to meet different purposes and conditions.

For example, the first camera 50 and the second camera 60 may have an image capture element and a depth sensor. The image capture element generates a capture image (RGB image in one example) in which pixels are arranged in two dimensions. The depth sensor is a distance detection device for generating distance data (depth data). The depth sensor is not limited to a certain type as long as the depth sensor is capable of obtaining data of the distance to the target object. For example, the depth sensor may use a stereo lens system or a LiDAR (Light Detection and Ranging) system. For example, the depth sensor may generate Depth images. In other embodiments of the present disclosure, either or both of the first camera (image capture unit) and the second camera (image capture unit) may, for example, utilize an ultrasonic element to obtain the distance data.

It should be noted that the first camera 50 is oriented in the first orientation A1. This means that the image capture direction of the image capture element and depth sensor of the first camera 50 is the orientation A1. Likewise, the second camera 60 is oriented in the second orientation A2. This means that the image capture direction of the image capture element and depth sensor of the second camera 60 is in the orientation A2. The orientations A1 and A2 do not necessarily have to be 180° opposites to each other, as long as the directions A1 and A2 allow image capturing of the product display shelf 410 and the stock shelf 420.

One or both of the first camera 50 and the second camera 60 may be provided for the holder unit 10. The first camera 50 and the second camera 60 may not necessarily be provided for the same member. For example, the first camera 50 may be mounted on one of the link members 21 to 23 and the second camera 60 may be mounted on another one of the link members 21 to 23. However, in the case where the first camera 50 and the second camera 60 are provided for the same member, in comparison with the case where the cameras 50 and 60 are provided on separate link members, respectively, there is an advantage that image processing computation is simplified because a common coordinate system is used.

The third camera 70 is a camera that changes its orientation in response to operation by an operator at a remote location, for example, to capture images of a predetermined target object. The third camera 70 is mounted on a part of the elevation mechanism 90, for example. The third camera 70 is movable vertically and horizontally in the space between the product display shelf 410 and the stock shelf 420. Further, the third camera 70 is rotatable around a pillar 95, and is configured to be able to capture images of the product display shelf 410 and the stock shelf 420, as necessary.

For example, the third camera 70 may adopt a stereo lens system. Although not limited, the third camera 70 may have a wide angle of view in comparison with the first camera 50 and the second camera 60. The third camera 70 may not be mounted on a part of the elevation mechanism 90, but may be held by a camera holding mechanism (not shown). For example, the camera holding mechanism may change the orientation of the third camera 70 in response to an input from an operator at a remote location so as to enable the third camera 70 to capture images of the product display shelf 410 and the stock shelf 420.

<Horizontal Movement Mechanism 80 and Elevation Mechanism 90>

The horizontal movement mechanism 80 has a base plate 81 and a drive mechanism (not shown). The base plate 81 supports the elevation mechanism 90, and slides along the rail 450. The drive mechanism (not shown) includes a motor, a roller, etc., and operates based on a control signal from the control device 150 (see FIG. 9) to move the elevation mechanism 90 to a predetermined position along the rail 450.

The elevation mechanism 90 has the pillar 95, a first elevation mechanism 91, and a second elevation mechanism 92. The pillar 95 is fixed on the base plate 81 and extends in the vertical direction.

The first elevation mechanism 91 has a drive mechanism (not shown). The drive mechanism (not shown) includes a motor and a linear guide, and operates based on a control signal from the control device 150 (see FIG. 9). By operating the drive mechanism (not shown), the first elevation mechanism 91 moves vertically up and down along the pillar 95.

The second elevation mechanism 92 is held by the first elevation mechanism 91. One end of the arm unit 20 is attached to the second elevation mechanism 92. The second elevation mechanism 92 has a drive mechanism (not shown). The drive mechanism (not shown) includes motors, linear guides, etc., and operates based on control signals from the control device 150 (see FIG. 9). By operating the drive mechanism (not shown), the second elevation mechanism 92 also moves vertically up and down.

In the case of holding a product 700 which is present at a predetermined height, the elevation mechanism 90 moves the arm unit 20 and the holder unit 10 by the first elevation mechanism 91 to a height around which the product 700 can be held, and the second elevation mechanism 92 finely adjusts the height of the arm unit 20 and the holder unit 10.

In this embodiment, the first elevation mechanism 91 and the second elevation mechanism 92 are provided as elevation mechanisms, but in other embodiments of the present disclosure, only one elevation mechanism may be provided.

<Structure of the Control Device 150>

As shown in FIG. 9, the control device 150 has a control unit 151, a memory unit 160, an operation unit 191, an output unit 193, and a communication unit 195. In FIG. 9, though the control device 150 is drawn as a single element, the control device 150 does not necessarily have to be a physically single element, but may be composed of a plurality of elements that are physically separated from each other. The control device 150 may be located in a remote location away from the store where the holder unit 10, the arm unit 20, and the elevation mechanism 90, etc. are located.

The operation unit 191 is a device for receiving input from the operator. Though not shown, the operation unit 191 has one or more input devices such as a keyboard, a mouse, a trackball, and a touch panel. The operation unit 191 may have other input devices such as a handle, a lever, a pedal, and a button. The operation unit 191 may have an audio input device such as a microphone. The operation unit 191 may have a gesture input device which recognizes and identifies operator's movements through image recognition.

The output unit 193 may be a device such as a speaker or a display. The communication unit 195 has a function of receiving data from the outside and transmitting data to the outside. The communication unit 195 corresponds to a product transfer communication unit of the present disclosure. In the case where the product transfer apparatus 1 is configured to be remotely operated, an input from the operator through an external operation unit is received by the communication unit 195, and the control device 150 allows the product transfer apparatus 1 to perform a predetermined operation based on the input. Communication between the external operation unit and the communication unit 195 may be either wired communication or wireless communication.

If the product transfer apparatus 1 is configured to be remotely operable, the operation unit 191 may be a device worn by the operator. The device includes a display device (not shown) and an operation device (not shown). The display device has a display which is visible to the operator. For example, the display device is a goggle-type display device. For example, the operation device may include one or more input sensors that can detect movement of the operator's body parts (e.g., hands and arms).

The memory unit 160 has an acquisition data memory unit 160*a* and a reference data memory unit 160*b*. The acquisition data memory unit 160*a* stores, for example, capture image data obtained by image capturing by the first camera 50, the second camera 60, and the third camera 70. The reference data memory unit 160*b* may store various items of data, etc. necessary for operation of the product transfer apparatus 1. For example, data related to the product display shelf 410 (shape data, size data, displayed product data, etc.) and data related to the stock shelf 420 (shape data, size data, stock product data, etc.) are stored. Further, SKU (Stock Keeping Unit) information on product stock may be stored in the reference data memory unit 160*b*.

<Structure of the Control Unit 151>

The control unit 151 is realized by one or more computers. The computer has a CPU, a ROM and a RAM, etc. The control unit 151 may be realized by a dedicated hardware circuit, such as an electronic circuit or an integrated circuit, or by a combination of the computer and the hardware circuit described above. Computer programs may be provided as applications, through communication networks such as the Internet, communication using mobile communication standards, other wireless networks, wired networks, or broadcasting. The control device 150 has a plurality of functions, as described later. Each function may be realized by a circuit such as an LSI (Large Scale Integrated circuit), a system LSI, etc. A single chip may have each of functions of a plurality of components, or a single chip may have functions of some or all of functions of a plurality of components.

The control unit 151 has an operation control unit 152, an image capture control unit 153, and a data processing unit 155.

The operation control unit 152 generates a control signal to operate the holder unit 10, the arm unit 20, the horizontal movement mechanism 80, and the elevation mechanism 90. The operation control unit 152 generates a control signal with reference to an input signal from the operation unit 191 and various items of data stored in the memory unit 160. The control signal may be generated using results of processing in the data processing unit 155. The operation control unit 152 also transmits and receives data through the communication unit 195 and also provides predetermined output through the output unit 193.

The image capture control unit 153 controls operation of the first camera 50, the second camera 60, and the third camera 70. The image capture timing, etc. of each of the cameras 50, 60 and 70 may be determined using data stored beforehand in the reference data memory unit 160*b*, for example.

The data processing unit 155 performs various items of information processing using the capture image data and the distance data (depth data) obtained by image capturing by the first camera 50, the second camera 60, and the third camera 70. The data processing unit 155 has a replenishment product identification unit 156, a stock product identification unit 157, a holding target identification unit 158, and a replenishment confirmation unit 159.

The replenishment product identification unit 156 analyzes the display shelf image data generated by image capturing of the product display shelf 410 by the first camera 50. The replenishment product identification unit 156 has one or both of the functions of determining, for example, whether or not the products 700 needs to be replenished and how many products 700 need to be replenished. The function to determine whether or not replenishment is needed may include a function to determine whether or not there is a space to place products and to determine whether or not replenishment is needed.

The stock product identification unit 157 analyzes the stock shelf capture image data generated by capturing images of the stock shelf 420 by the second camera 60. The stock product identification unit 157 has a function to determine, for example, whether or not the product 700 to be replenished is included in the capture image data. The stock product identification unit 157 has one or more of the functions of identifying the product 700 on the stock shelf 420, and identifying an identification number, identification ID, a product name, and other items of information of the product 700.

The stock product identification unit 157 may have a function to determine whether or not the product 700 on the stock shelf 420 has the cap member 702, a function to identify the position of the stock product (position in the depth direction of the stock shelf) based on the position of the cap member 702, and a function to identify the position in a left-right direction perpendicular to the depth direction so as to identify the position of the stock product. Further, the stock product identification unit 157 may have a function of identifying the holding position P1 of the product 700 based on the position of the cap member 702. In addition to the specific methods described above, the stock product identification unit 157 may use any method to obtain position information (coordinate information) of each of the products placed on the stock shelf 420.

In label-less PET bottle beverages, etc., if the container body 701 and content in the container body 701 are translucent, it may not be possible to obtain accurate depth data by analyzing the capture image data of the container body 701. In contrast, the cap member 702 tends to be colored and made of non-translucent material. So, it is easy to perform accurate image analysis. Therefore, in this embodiment, the cap member 702 is identified and image analysis is performed based on the image of the identified cap member 702. The cap member 702 may be identified based on the RGB image data, and the data of the distance to the product 700 may be measured based on the position of the cap member 702.

The holding target identification unit 158 analyzes the capture image data obtained by image capturing by the second camera 60 in order to hold the object with the holder unit 10. For example, the holding target identification unit 158 has one or more of functions of identifying the contour shape of the product 700, determining whether or not the product 700 on the stock shelf 420 has the cap member 702, identifying the position of the center of gravity of the shape of the product 700, and determining the holding position based on the shape or the position of the center of gravity of the product 700. The holding target identification unit 158 may determine the holding position based on the capture image data from the third camera 70, for example, during remote control.

For example, in the case where the product 700 has the cap member 702 as shown in FIG. 1, the holding target identification unit 158 sets the holding position P1 near the cap member 702. In contrast, in the case of the product 700A (see FIG. 3) which does not have any cap member, the holding target identification unit 158 sets a side portion of the cylindrical container as the holding position. As a specific example, in the case of holding a cylindrical container, the holding target identification unit 158 may set a position roughly in the middle of the container in the height direction (i.e., a position corresponding to the position of the center of gravity) as the holding position. From the viewpoint of stability when the product is held, the holding target identification unit 158 may set a position at the upper end of the cylindrical container in the height direction (e.g., a position higher than two-thirds of the product height) as the holding position.

The replenishment confirmation unit 159 analyzes the captured image data generated by image capturing of the stock shelf 420 by the second camera 60. It is assumed that when the product transfer apparatus 1 captured images of the stock shelf 420 at a certain time, there were no products in stock, but later, the store employee or other person placed the stock products on the stock shelf 420, and the stock shelf has changed to a state where there are products in stock. The replenishment confirmation unit 159 has a function of determining whether or not the stock shelf 420 has been replenished with products. In the case where the replenishment confirmation unit 159 determines that the stock shelf 420 has been replenished with products, the operation control unit 152 may operate to move the holder unit 10 toward the product display shelf 410.

<Replenishment Operation of the Products 700>

Figure 10:
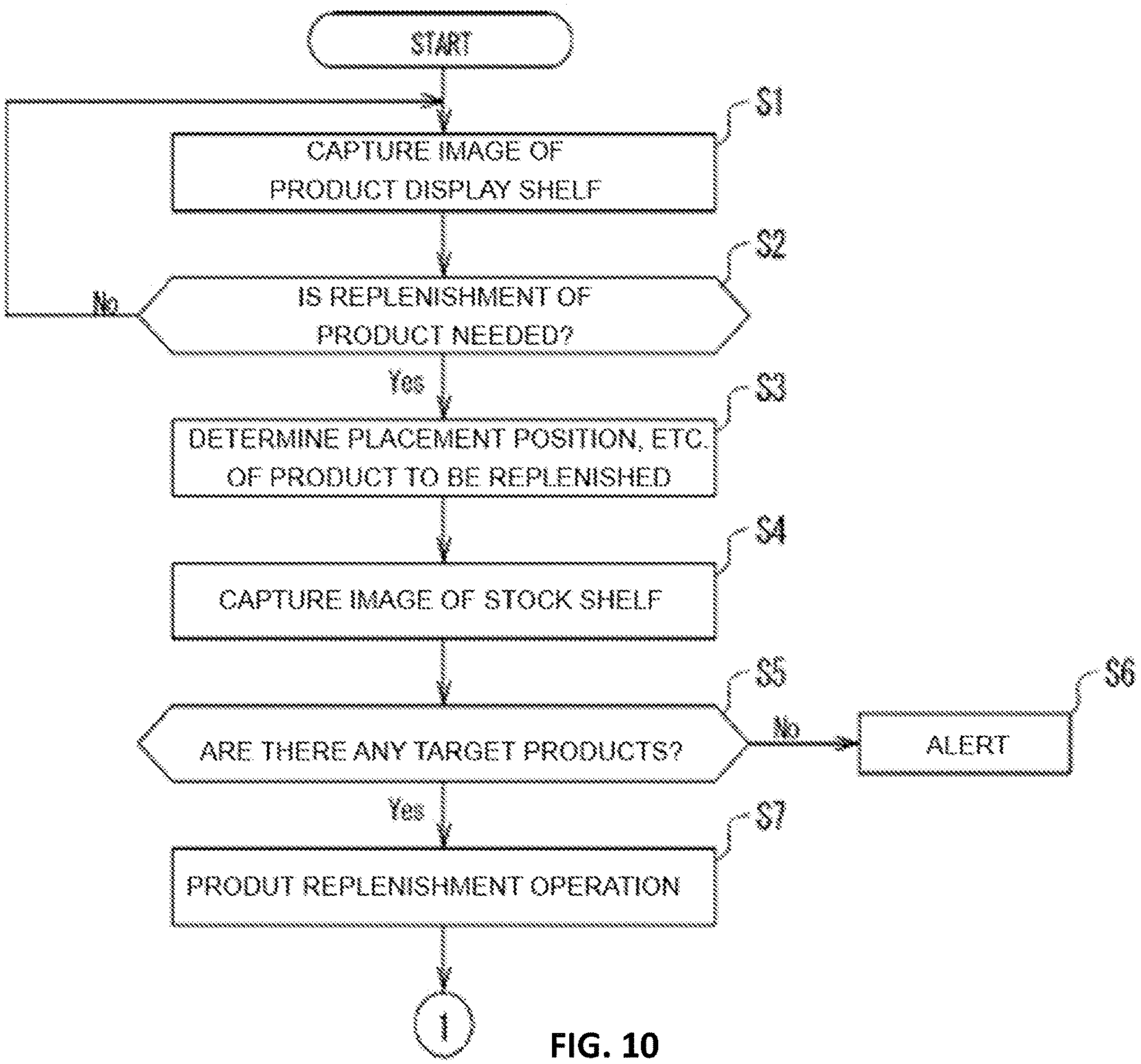
FIG. 10 is a flow chart showing replenishing operation by the product transfer apparatus.

The flow of replenishment of the products 700 by the product transfer apparatus 1 will be described below. FIG. 10 is a flow chart of the replenishment operation of the products 700 by the product transfer apparatus 1. In the flow chart of FIG. 10, each of the steps illustrated need not necessarily be performed in this order. One step may be performed in parallel with the other steps or the steps may be performed in reverse order. Image capturing of the product display shelf 410 by the first camera 50 and image capturing of the stock shelf 420 by the second camera 60 may be performed in parallel or at different timings.

The conditions of the product display shelf 410 and the stock shelf 420 at the time of starting replenishment of the products 700 will be described below. As shown in FIGS. 3 and 4, the products 700 are placed in an area C10 which is a part of the product display shelf 410. The area C10 is located on the upper left side of the product display shelf 410, as viewed from the back side of the shelf 410. On the other hand, as shown in FIG. 6, the products 700 to be replenished are positioned beforehand in an area C20 which is a part of the stock shelf 420. The area C20 is located on the upper right side of the stock shelf 420 when the stock shelf 420 is viewed from the front side. In this embodiment, the areas C10 and C20 face each other across the aisle T.

The height position and the horizontal position of the area C10 and the height position and the horizontal position of the area C20 do not have to be exactly the same. In one example, the areas C10 and C20 should have a positional relationship where the arm unit 20 can reach either the area C10 or the area C20 without moving the horizontal movement mechanism 80 and the elevation mechanism 90.

Replenishment operation of the products 700 by the product transfer apparatus 1 is started, for example, when there is an input from an operator to start the replenishment operation. Alternatively, the product transfer apparatus 1 may be configured to automatically start the replenishment operation, for example, at a predetermined time. The "input of the start from the operator" may be an input from a store employee in the store. Alternatively, in the case where the product transfer apparatus 1 is configured to be remotely operable, the "input of the start from the operator" may be an input from an operator at a remote location.

Possible methods of replenishing the products 700 by the product transfer apparatus 1 include (i) a method in which, at the beginning of the replenishment operation, the product transfer apparatus 1 captures images of the entire product display shelf 410 and the stock shelf 420 to obtain data of the display status and the stock status of the products 700, and then performs replenishment for each product 700, and (ii) a method in which the product display shelf 410 is divided into a plurality of areas, and image capturing and replenishment are repeated for each area. Hereinafter, the method (ii) will be described below.

Firstly, in step S1, the product transfer apparatus 1 starts image capturing of the product display shelf 410. Prior to image capturing, the operation control unit 152 operates the horizontal movement mechanism 80 and the elevation mechanism 90 to move the arm unit 20 to a position where the first camera 50 can capture images of the area C10. The operation control unit 152 moves each of the link members 21 to 23 of the arm unit 20 to extend the arm unit 20 in the direction along, for example, the rail 450 (not all the link members 21, 22, 23 necessarily extend in a row).

As described above, the product display shelf 410 and the stock shelf 420 face each other, and the first camera 50 and the second camera 60 are disposed in opposite orientations to each other. Therefore, in the state where the arm unit 20 extends along the rail 450, the first camera 50 faces the product display shelf 410 and the second camera 60 faces the stock shelf 420.

The image capture control unit 153 operates the first camera 50 to capture images of the area C10 of the product display shelf 410 while the arm unit 20 is stopped. RGB image data and depth data are obtained as the captured image data of the area C10. The capture image data taken by the first camera 50 is stored in the acquisition data memory unit 160*a*. Image capturing by the first camera 50 may be performed during movement of the arm unit 20.

Next, in step S2, it is determined whether or not the products 700 need to be replenished. The replenishment product identification unit 156 analyzes RGB image data and/or depth data of the area C10 to obtain information about the display status of the products 700. To obtain the information about the display status, for example, the replenishment product identification unit 156 performs the following processes.

The replenishment product identification unit 156 identifies the type of the products 700 based on the RGB image data of the area C10. The replenishment product identification unit 156 may, for example, identify the type of the products 700 in the image based on a data table stored beforehand in the reference data memory unit 160*b* and the obtained RGB image data. It should be noted that coordinate data may be assigned to each of the products 700 beforehand according to the position of the tier and the lane of the product display shelf 410, and the coordinate data may be used to identify the lane and the product.

The replenishment product identification unit 156 also obtains information about whether or not the number of products 700 is decreased from a predetermined reference state, as information about the display status. For example, the replenishment product identification unit 156 refers to a data table stored beforehand in the reference data memory unit 160*b*. The data table contains depth reference value data of a state in which there are sufficient products 700 (for example, products 700 are fully arranged on the shelf plate). For example, the "depth reference value" is a value of the depth data from a given reference point to the rearmost product 700 (i.e., the product 700 shown in the frontmost position in the image). For example, the value of the depth reference value data is 100 [mm]. For example, the value of the depth data of the captured image of the product 700 is 300 [mm].

The replenishment product identification unit 156 compares the value of the depth data (300 [mm]) obtained by image capturing of the product 700 with the value of the depth reference value data (100 [mm]). If the difference exceeds a predetermined value, the replenishment product identification unit 156 determines that the number of products 700 has decreased from the predetermined reference state and determines that the products 700 needs to be replenished.

In order to determine whether or not the products 700 need to be replenished, the following process may be performed instead of the above process. As a premise, it is assumed that certain preset data is stored in the reference data memory unit 160*b*. The preset data may include data such as the distance between both ends of the target lane in the depth direction, the bottom size of the product 700, and the distance that should be left open from the end of the target lane on the robot side. The data processing unit 155 detects a predetermined reference point (e.g., holding point) of the target product 700 based on the RGB image data. Further, the data processing unit 155 detects the distance to the holding point (distance from the sensor to the holding point) as an example, based on the detection results of the depth sensor. Then, based on the above preset data and the distance data, the data processing unit 155 determines whether or not the product 700 can be displayed.

In step S2, if it is determined that replenishment of the products 700 is not needed, the operation control unit 152 moves the arm unit 20 to the next area C10 in the product display shelf 410 and repeats the processes of steps S1 and S2 described above. It should be noted that at the time of dividing the product display shelf 410 into a plurality of areas C10 and replenishing the products 700, the order in which the plurality of areas C10 are replenished is not limited specially. For example, if it is determined that the first area C10 does not need to be replenished with the products 700, replenishment may be performed in the next area C10 adjacent to the left side or the right side of the area C10.

In step S2, if it is determined that replenishment of the products 700 is needed, then in step S3, the placement position of the products 700 is identified. That is, the replenishment product identification unit 156 analyzes the capture image data of the area C10 and identifies at which position the product 700 to be replenished should be placed. Specifically, the replenishment product identification unit 156 generates information about a placement location which is the location where the product 700 to be replenished is placed, and this position information is stored in the acquisition data memory unit 160*a*.

Though not limited, the replenishment product identification unit 156 may analyze the capture image data of the area C10 to determine whether or not there is sufficient space Sp (see FIG. 2) behind the displayed product 700 to replenish the product 700. Such determination of the presence or absence of space Sp may be performed together with the step of determining whether or not product replenishment is required based on data of the distance to the product 700 as described above, or as a step of determining whether or not product replenishment is required. That is, in the case where it is determined that space Sp is present, replenishment of the products 700 is determined to be needed, and replenishment may be performed.

The replenishment product identification unit 156 may further analyze the captured image data of the area C10 to identify the number of products 700 that should be replenished for the area C10. For example, the replenishment product identification unit 156 may determine the number of products 700 to be replenished based on the difference between the value of the depth data obtained in step S2 (300 [mm]) and the value of the depth reference value data (100 [mm]). It should be noted that replenishment product identification unit 156 does not determine the number of products to be replenished, but may simply repeat replenishment of the products 700 until replenishment becomes no longer necessary, based only on information about whether or not the products 700 need to be replenished.

The replenishment product identification unit 156 can use various methods other than the methods described above in determining whether or not replenishment of the products is needed and in determining the number of products that should be replenished. For example, in the case where the shape information of the three-dimensional space in which the products 700 are to be displayed is stored in the memory unit beforehand, the replenishment product identification unit 156 may perform the following process. The replenishment product identification unit 156 may determine what percentage of the three-dimensional space is occupied by the products 700, and if the value of the percentage is not more than a predetermined reference value, determine that replenishment of the products 700 is needed (which also means that there is space Sp to place the products 700).

The above series of processes based on the image capturing results of the first camera 50 may be summarized as follows. That is, for example, the replenishment product identification unit 156 firstly detects the holding point of the product 700 based on the RGB image of the first camera 50. Then, based on the detection results of the depth sensor, the replenishment product identification unit 156 detects the distance from the sensor to the holding point. By the processes up to this point, for example, it is determined how remote a certain product 700 on the display shelf is from a predetermined measurement reference point (in this case, the sensor [first camera]). Thereafter, it is determined whether or not the display is possible based on the preset data and the distance data. If display is possible, the replenishment operation described later is performed.

Next, image capturing of the stock shelf 420 by the second camera 60 will be described. In step S4, image capturing of the stock shelf 420 is performed by the second camera 60. Image capturing of the stock shelf 420 by the second camera 60 may be performed in parallel with image capturing of the product display shelf 410 by the first camera 50. In the same manner as step S1, in the state where the arm unit 20 is moving or the arm unit 20 is stopped, the image capture control unit 153 operates the second camera 60, and image capturing of the stock shelf 420 is performed by the second camera 60. As shown in FIG. 6, the second camera 60 captures images of the area C20 of the stock shelf 420. The image data obtained by image capturing of the second camera 60 is stored in the acquisition data memory unit 160*a*. RGB image data and depth data are obtained as the capture image data of the area C20.

Assuming that only one image capture device is provided on the arm unit 20, the following operation is required to capture images of the product display shelf 410 and the stock shelf 420. That is, firstly, the arm unit 20 is moved toward the product display shelf 410 and an image capture device is used to capture images of the product display shelf 410 of products 700 to determine whether or not the products 700 need to be replenished. Thereafter, the arm unit 20 is then moved toward the stock shelf 420 and an image capture device is used to capture images of the stock shelf 420 to determine whether or not the products 700 to be replenished are present on the stock shelf 420.

In contrast, the product transfer apparatus 1 has the first camera 50 and the second camera 60 on both the left and right sides of the arm unit 20. Therefore, after the arm unit 20 is moved to a predetermined position between the product display shelf 410 and the stock shelf 420, the arm unit 20 can capture images of the product display shelf 410 and the stock shelf 420 as it is, without moving the arm unit 20. Therefore, since there is no need to move the arm unit 20 between image capturing of the product display shelf 410 and image capturing of the stock shelf 420, image capturing of the product display shelf 410 and image capturing of the stock shelf 420 can be performed in a short period of time efficiently.

This working effect is obtained by eliminating the need to move the arm unit 20 between image capturing by the first camera 50 and image capturing by the second camera 60. Therefore, even if image capturing by the first camera 50 and image capturing by the second camera 60 are not performed at exactly the same time, the same working effect can be obtained. For example, without moving the arm unit 20, image capturing by the first camera 50 and image capturing by the second camera 60 can be performed one at a time in turn or alternately multiple times within a relatively short period of time (a few seconds, for example).

Next, in step S5, it is determined whether or not there are any products 700 to be replenished on the stock shelf 420. The stock product identification unit 157 analyzes the capture image data obtained by image capturing by the second camera 60 to determine whether or not the image contains any products 700 to be replenished. In step S5, the stock product identification unit 157 also obtains the position information of the product 700. Specifically, the stock product identification unit 157 analyzes the capture image data obtained by image capturing by the second camera 60 to identify the three-dimensional coordinate information indicating location of each of the products 700. This position information is stored in the acquisition data memory unit 160*a* and is used at the time of moving the holder unit 10 toward the product 700 in the product replenishment operation described later.

In addition to the above, the following methods may be used. Firstly, information about which products are placed at which positions on the stock shelf 420 (in other words, information indicating the correspondence between positions on the stock shelf 420 and the products placed at the positions) is stored beforehand, for example, in an arbitrary memory unit in the system. The product transfer apparatus 1 may identify the positions of the products 700 to be replenished based on the stored information and/or the capture image data.

In step S5, if the stock item identification unit 157 determines that no products 700 to be replenished are included, in step S6, an alert may be issued to inform the store employee or the operator that no products 700 are in stock. Specifically, the operation control unit 152 may send predetermined alert information to external devices through the communication unit 195. Alternatively, the operation control unit 152 may display alert information on a display or the like as the output unit 193, or output alert sounds or alert messages from a speaker as the output unit 193.

Figure 11:
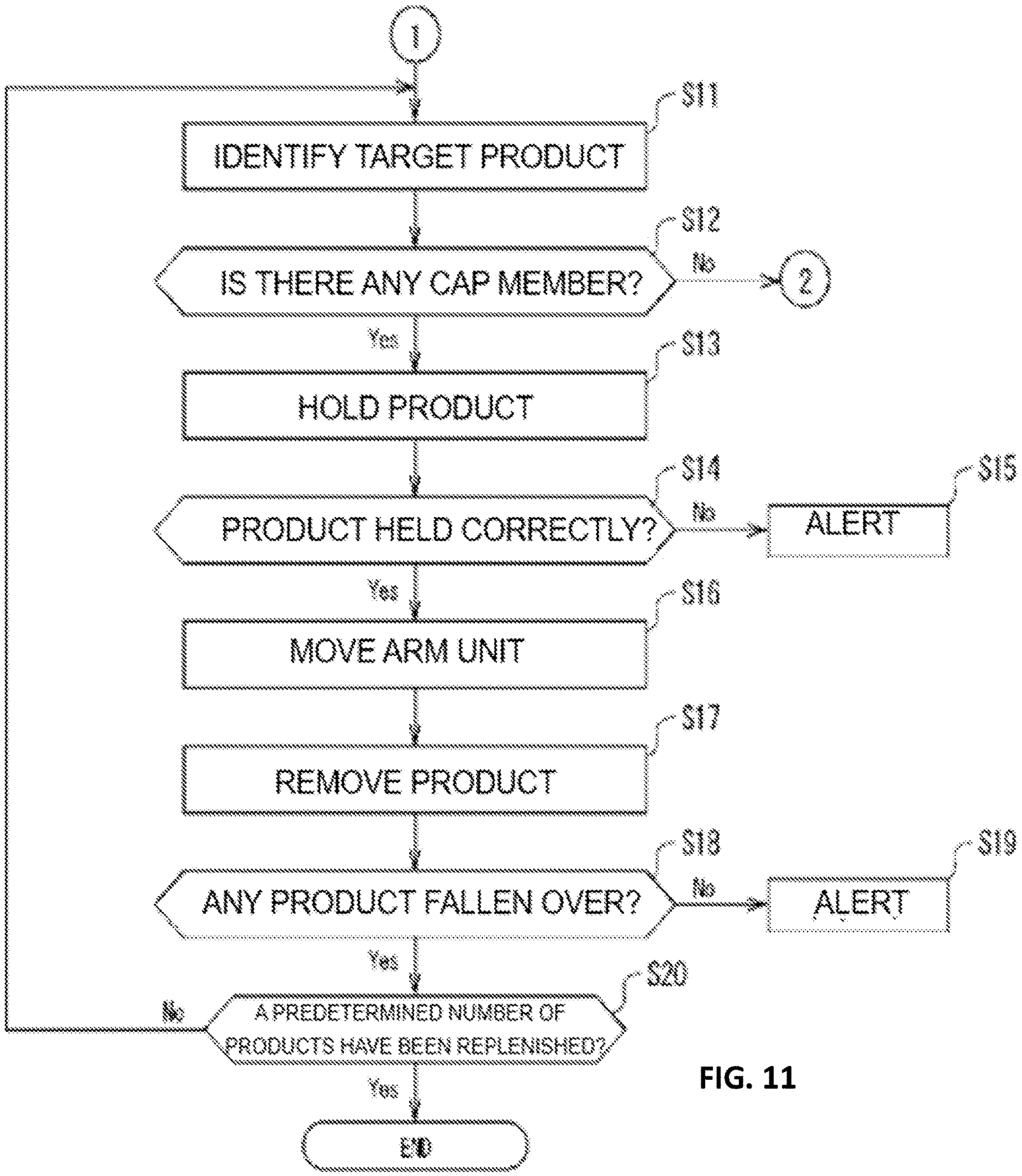
FIG. 11 is a flow chart showing replenishing operation of holding the product on the stock shelf, and moving the product to the product display shelf.

If the stock item identification unit 157 determines that products 700 to be replenished are included, then, in step S8, the replenishment operation of the products 700 is performed. FIG. 11 is a flow chart of the replenishment operation of moving the product 700 on the stock shelf 420 to the product display shelf 410. The replenishment operation of the products 700 will be described below with reference to the flow chart in FIG. 11.

<Specific Operation of Replenishing the Product 700>

In step S11 of FIG. 11, the holding target identification unit 158 identifies the product 700 on the stock shelf 420 based on the capture image data, etc. obtained by the second camera 60, and obtains positional information, etc. For convenience of explanation, though step S11 and step S5 in FIG. 10 are shown as separate steps, these processes may be performed in the same step.

Next, in step S12, the holding target identification unit 158 analyzes the capture image data (e.g., RGB image) to determine whether or not the target product 700 has the cap member 702. If the target product 700 is determined to have the cap member 702 (determination result in step S12 is Yes), the holding target identification unit 158 analyzes the capture image data to determine the holding position P1 near the cap member 702.

As described above, the holding position P1 may be the periphery of the cap member 702 in the case where the product is a container having the cap member 702, or may be the side portion of the container in the case of a product 700A which is a container without any cap member 702. The detailed flow of determining the holding position will be described below with reference to another flow chart.

Figure 12:
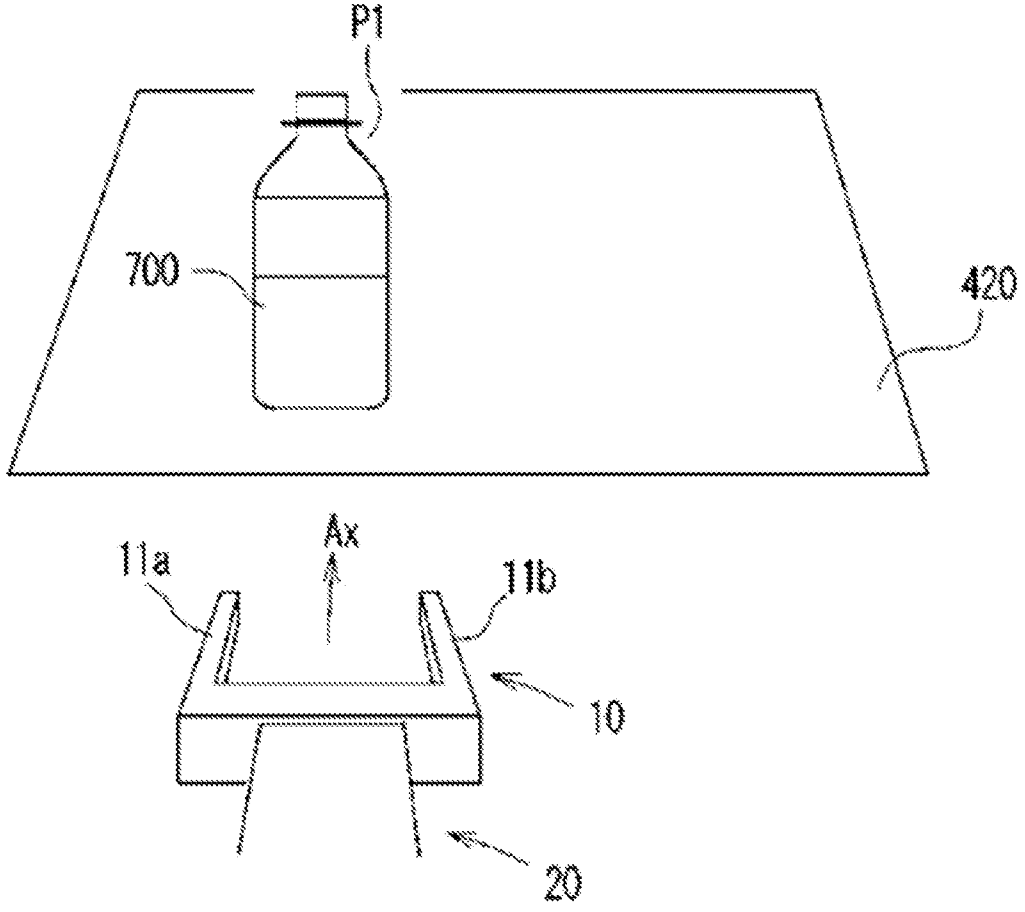
FIG. 12 is a view showing a state where a holder unit moves toward the product on the stock shelf.

In step S13, for allowing the holder unit 10 to hold the product 700, the operation control unit 152 moves the arm unit 20 in a manner that the holder unit 10 is positioned in front of the product 700, as shown in FIG. 12. The arm unit 20 is moved using information of the position where the product 700 is placed, as identified in step S11 described above.

In step S13, the operation control unit 152 operates the arm unit 20 to move the holder unit 10 forward to a position where the holder unit 10 can hold the target product 700 at the holding position P1.

Thereafter, the operation control unit 152 moves the pair of holding members 11*a* and 11*b* close to each other to hold the target product 700. After the product 700 is held, the operation control unit 152 moves at least one of the holder unit 10 and the arm unit 20 slightly vertically upward to lift the product 700.

It should be noted that, in the case where the robot arm holds a target object as shown in FIG. 12, for example, it can be contemplated to adopt control where a single camera is placed on a top surface of the arm unit or the holder unit (one example) to capture images the front side of the target object, and the robot arm is moved while capturing images of the object. However, in this structure, depending on the size of the target object and the position at which the target object is held, after the target object is held, the target object may block the camera, and it may become difficult to control the camera properly in a dynamics environment. In contrast, according to the structure of the present embodiment, such a problem does not occur.

In step S14, it is determined whether or not the holder unit 10 is correctly holding the product 700. If the operation control unit 152 determines that the product 700 is not held correctly (determination result in step S14 is No), in step S15, an alert is issued to the operator, etc. The operation control unit 152 may issue the alarm by operating the output unit 193. The product transfer apparatus 1 may perform the operation of holding the product 700 again instead of issuing the alert or in addition to issuing the alert.

If the operation control unit 152 determines that the product 700 is correctly held (determination result in step S14 is Yes), in step S16, the operation control unit 152 moves the arm unit 20 toward the product display shelf 410. The operation control unit 152 operates the arm unit 20 to move the product 700 to the space Sp to be replenished with the product, for example, based on the position information of the space Sp.

Next, in step S17, the operation control unit 152 moves the holding members 11*a* and 11*b* of the holder unit 10 away from each other to release the product 700 and place the product 700 on the product display shelf 410. At the time of releasing the product 700, for example, as shown in FIG. 5, the product 700 may be held slightly with inclination such that the bottom of the product 700 becomes parallel to the shelf plate 411, and in this state, the product 700 may be released by moving the holding members 11*a* and 11*b* away from each other. In this manner, the possibility that the product 700 falls over when the product 700 is placed is reduced.

In this regard, if the operation control unit 152 does not consider the shape of the product 700 and adopts control where every product 700 is released from a certain height from, for example, the shelf plate 411, the possibility that the product 700 falls over will increase. This is because the product 700 in a short container body 701 will be released from a position away from the shelf plate 411. Therefore, the operation control unit 152 may also adjust the height at which the product 700 is released from the holder unit 10 in accordance with the shape of the product 700.

Preferably, the operation control unit 152 considers the shape of the product 700 and adjusts the position of releasing the product 700 as necessary. Specifically, the operation control unit 152 may determine the height at which the product 700 is released based on the contour shape data (product size information) obtained by identifying the contour shape of the product 700 by the holding target identification unit 158.

The operation control unit 152 refers to the determined release height information of the product 700 and operates the arm unit 20 and the holder unit 10 to release the product 700. Using this type of control, the product 700 is no longer released from a position which is too high. Thus, it is possible to reduce the possibility that the product 700 falls over.

Next, in step S18, it is determined whether or not the product 700 has fallen over (step 18 is an optional step).

The product transfer apparatus 1 may detect only the falling of the product 700, or the product transfer apparatus 1 may detect abnormality by determining whether or not the state of the product 700 is different from a predetermined normal state.

Various specific methods may be used. For example, the product transfer apparatus 1 may use the following method. Firstly, based on the RGB data of the target product display shelf 410, the data processing unit 155 derives the probability of falling and determines whether or not the product has fallen over. The probability of falling occurrence may be obtained, for example, by using an algorithm which is trained using data obtained at the time of falling and data obtained at the time of non-falling as teaching data. For example, it may be possible to use a method where the value at the time of non-falling is set to "0" and the value at the time of falling is set to "1", and if the value of the probability of falling occurrence is, for example, 0.5 or more, then falling is determined to have occurred.

In step S18, the presence or absence of abnormality may be detected by the following process, rather than based on whether or not the product 700 has fallen over. The following process is useful, for example, in dealing with a situation where the product 700 has not slid forward to the display shelf and has stopped in the middle of the shelf.

The image capture control unit 153 obtains data of the distance to the placed product 700, and the data processing unit 155 refers to the data. Based on the data that had been detected before the replenishment operation of the product 700 was started and data such as the size of the product, for example, the distance to the product 700 after replenishing one product (distance to the last product 700 on the shelf plate) can be calculated. This distance will be referred to as the "theoretical distance". The data processing unit 155 compares the data of the distance to the product 700 measured after placing the product 700 and the above theoretical distance data, and if the difference between these values is not less than a predetermined value, determines that an abnormal condition has occurred.

In a specific case, for example, it is assumed that data of the distance to the product after replenishing one item of the product 700 is theoretically "150 mm". However, if actually measured data is "100 mm", it is presumed that the product 700 did not successfully slide out of the shelf plate. In the structure of the embodiment, such a condition is determined as abnormal.

If it is determined that the condition is abnormal (determination result in step S18 is No), in step S19, an alert is issued to the store employee or the operator, etc. Instead of or in addition to issuing the alert, the product transfer apparatus 1 may hold the product 700 and perform the operation of placing the product 700 again.

It should be noted that one or more of the following approaches may be taken for abnormal conditions in the present disclosure.

(a) Continue the display based on the theoretical distance.

(b) Extend the holder unit to the stopped product and push the product out.

(c) Issue an alert to the store employee, etc.

For example, the approach (a) is based on an expectation that the placement of the next product on the shelf will trigger the product placed in one previous replenishment operation to slide out to the front side of the shelf. In the approach (b), the product transfer apparatus 1 moves the arm unit 20 and the holder unit 10, and pushes the product 700 toward the front side of the shelf so as to move the product 700 to the normal position. As described above, the approach (c) is an approach which encourages the store employee, etc. in the store to provide assistance.

In step S20, the operation control unit 152 determines whether or not the predetermined number of the products 700 have been replenished. The product transfer apparatus 1 continues the above series of operations until the predetermined number of products are replenished, and completes the product replenishment operation when the predetermined number of products have been replenished.

By the above operation, the product transfer apparatus 1 can determine whether or not the products 700 need to be replenished based on the display status of the product display shelf 410, and thereafter, move the products 700 which needs to be replenished from the stock shelf 420 to the product display shelf 410 to replenish the products 700. In this embodiment, the first camera 50 and the second camera 60 are provided on both of the left and right sides of the arm unit 20, and at the time of holding the product 700, image capturing of the target product 700 is not performed by these cameras. However, the product transfer apparatus 1 can perform the replenishment operation of the products 700 suitably based on the position information of the products 700, etc., which has been obtained beforehand based on the capture image data of the second camera 60.

Figure 15:
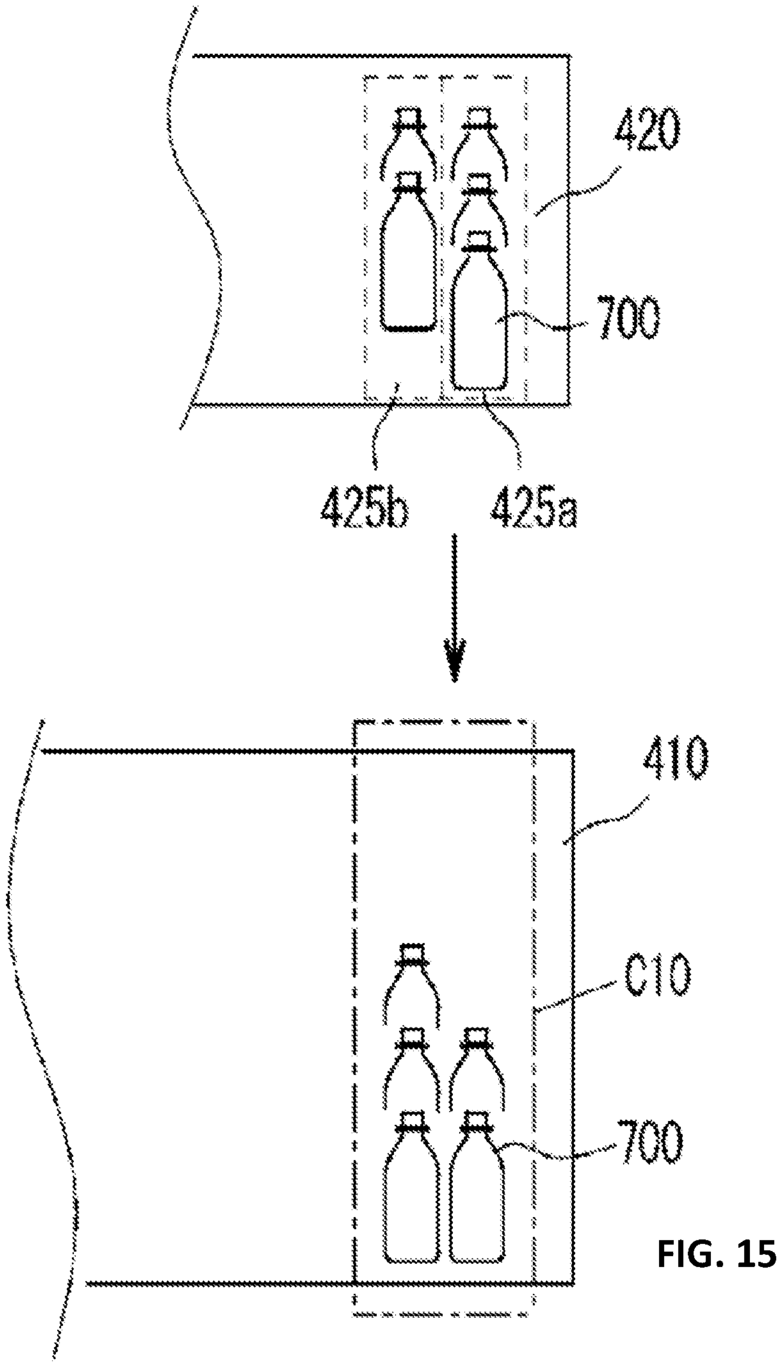
FIG. 15 is a view illustrating replenishing operation of stock products arranged in a plurality of rows.

An example of a procedure for replenishing the products 700 from the stock shelf 420 to the product display shelf 410 may be as follows. FIG. 15 illustrates the replenishment operation of stock products arranged in a plurality of rows. For example, it is assumed that five products 700 need to be replenished in the area C10 of the product display shelf 410 and that the products 700 are arranged in two rows on the stock shelf 420, as shown in FIG. 15. In this example, there are three products in stock in a first lane space 425*a* in the first row, and two products in a second lane space 425*b* in the second row. In such a case, firstly, for example, the product transfer apparatus 1 moves the products 700 in the first lane space 425*a* to the product display shelf 410.

Next, the product transfer apparatus 1 moves the arm unit 20 to the adjacent second lane space 425*b* based on the position information, etc. of each of the lane space 425*a*, 425*b* obtained beforehand, and moves the products 700 of the second lane space 425*b* to the product display shelf 410. In one embodiment, it is preferable that, even in the case where the products 700 are placed on the stock shelves 420 over a plurality of rows as described above, the product 1 is configured to transfer apparatus automatically replenish all the required number of products 700 in a series of operations. The computing process required to perform the above operation can be implemented by any control means, and though subject of the processing is not limited specially, as an example, the control unit 151 (more specifically, the operation control unit 152, etc.) may perform the necessary processes.

[Filling Operation in the Case of a Container without any Cap Member]

Figure 13:
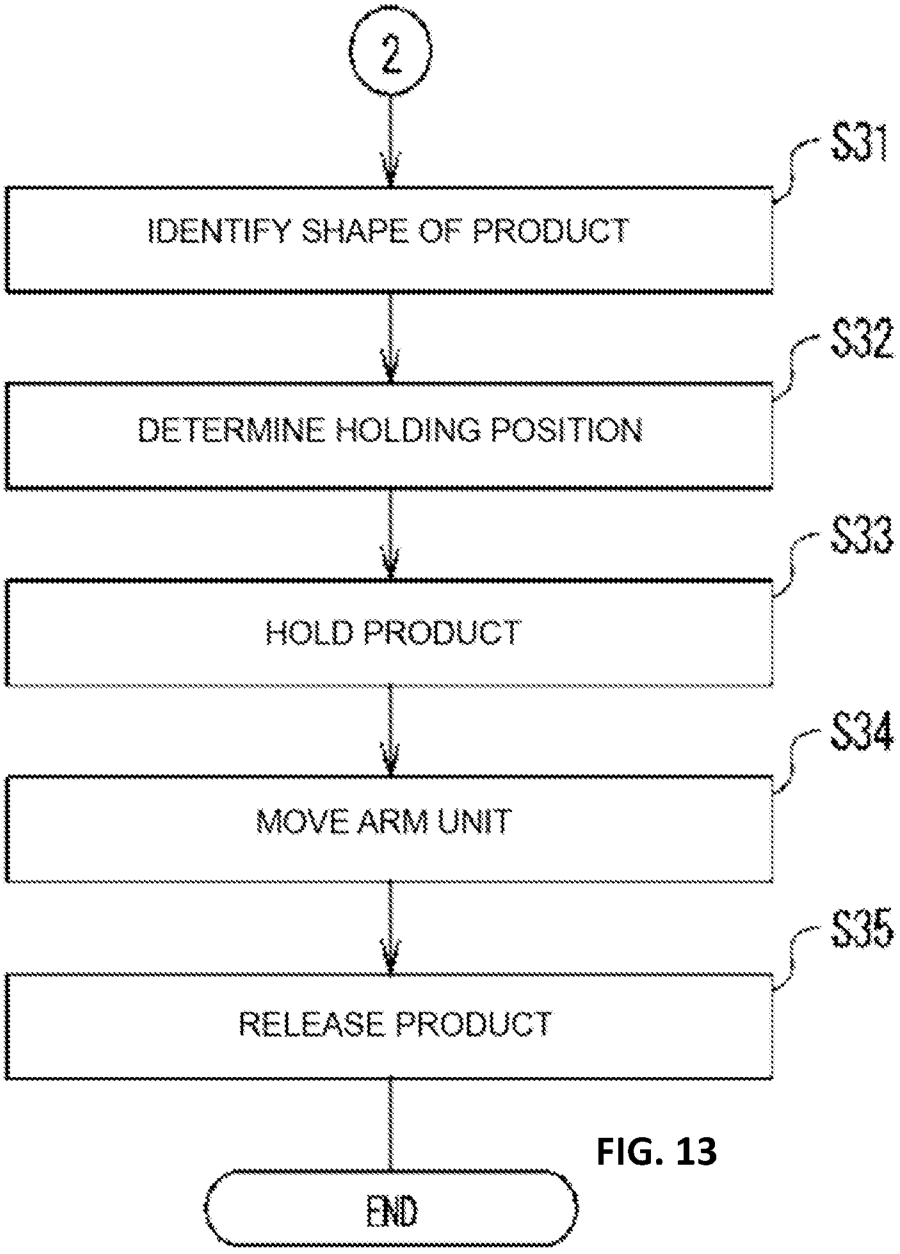
FIG. 13 is a flow chart showing replenishing operation of a container without any cap member as a product.

Next, the replenishment operation in the case of a product 700A of a container without any cap member will be described. FIG. 13 is a flow chart of the replenishment operation of the product 700A of the container without any cap member. As described above, in step S12, it is determined whether or not the target product has a cap member.

If the holding target identification unit 158 determines that the target product does not have any cap member (determination result in step S12 is No), then in step S31, the holding target identification unit 158 identifies the shape of the target product 700A. Specifically, the holding target identification unit 158 identifies the contour shape of the product 700 based on the image data captured by the second camera 60.

Next, in step S32, the holding target identification unit 158 determines the position for holding the product 700A. In the case where the product 700A is, for example, a cylindrical container, the holding target identification unit 158 sets the left and right sides of the outer periphery of the product 700A as the positions to be held by the holder unit 10. As described above, the holding target identification unit 158 may determine a position substantially near the middle of the container of the product 700A in the height direction (i.e., a position corresponding to the center of gravity) as the holding position, or the holding target identification unit 158 may determine a position on the upper end side as the holding position.

Next, in step S33, the operation control unit 152 moves the arm unit 20 and the holder unit 10 based on information of the holding position identified in step S32 to hold the product 700.

Thereafter, in step S34, the operation control unit 152 operates the arm unit 20 to move the product 700 from the stock shelf 420 to the product display shelf 410, and in step S35, releases the product 700. Steps S33 to S35 may be performed in the same steps as steps S13, S16, and S17 of the flow chart in FIG. 11. After step 35, the flow from step 18 and subsequent steps in FIG. 11 may be performed.

The specific apparatus structure and operation control of this embodiment have been described above with reference to the drawings. The product transfer apparatus 1 according to the embodiment can identify the status of product display on the product display shelf 410 and automatically replenish the products 700 by moving the products 700 from the stock shelf 420 as necessary. In particular, since the first camera 50 and the second camera 60 are positioned in opposite orientations to each other, image capturing of the product display shelf 410 and image capturing of the stock shelf 420 can be efficiently ascertained in a short period of time.

Further, at the time of holding the product 700 on the stock shelf 420 or placing the product on the product display shelf 410, it is determined whether or not the product 700 is properly moved, and if the product 700 is not properly held or the product 700 is not properly placed on the product display shelf 410, an alert is issued. This process prompts the store employee or the operator to take action, and it becomes possible to carry out the replenishment of the products 700 more reliably.

Further, in the analysis of the capture image data, depth data, etc., is obtained not based on the container body 701 but based on the cap member 702. Therefore, even if the container body 701 is a transparent member, and it is difficult to obtain the depth data, the position information of the product 700 can be obtained suitably based on the cap member 702.

In the case of a product is a container having the cap member 702, the holding position P1 is set near the cap member 702. So, it is possible to stably hold the product 700 by the holder unit 10. On the other hand, even in the case where the product 700A is a container without any cap member 702, the product 700A in a container without the cap member 702 can also be held suitably because it is possible to set a suitable holding position for every shape of the product 700 based on the contour shape information obtained by image analysis. It should be noted that, with respect to the product of the container having the cap member 702, an example of holding the container body rather than the area near the cap member 702 will be described later.

In the structure of the embodiment, the first camera 50 and the second camera 60 provided for the product transfer apparatus 1 can identify the product 700. Therefore, because there is no need to install new equipment on the product display shelf or the stock shelf in the store, the product transfer apparatus 1 according to the embodiment can be easily introduced into the existing store.

Although the embodiment of the present disclosure has been described above with specifically reference to the drawings, the present disclosure is not limited to the above described embodiment. The disclosure may be modified as necessary without departing from the gist of the disclosure.

The above embodiment describes an example in which the product 700 to be replenished is taken from the stock shelf 420. However, for example, the product transfer apparatus according to other embodiments of the present disclosure may have a function of taking out the products from a cardboard box (product storage box) and replenish the stock shelf with the products.

Second Embodiment

<System Having a Product Transfer Apparatus 1A and a Management Apparatus 3>

Figure 14:
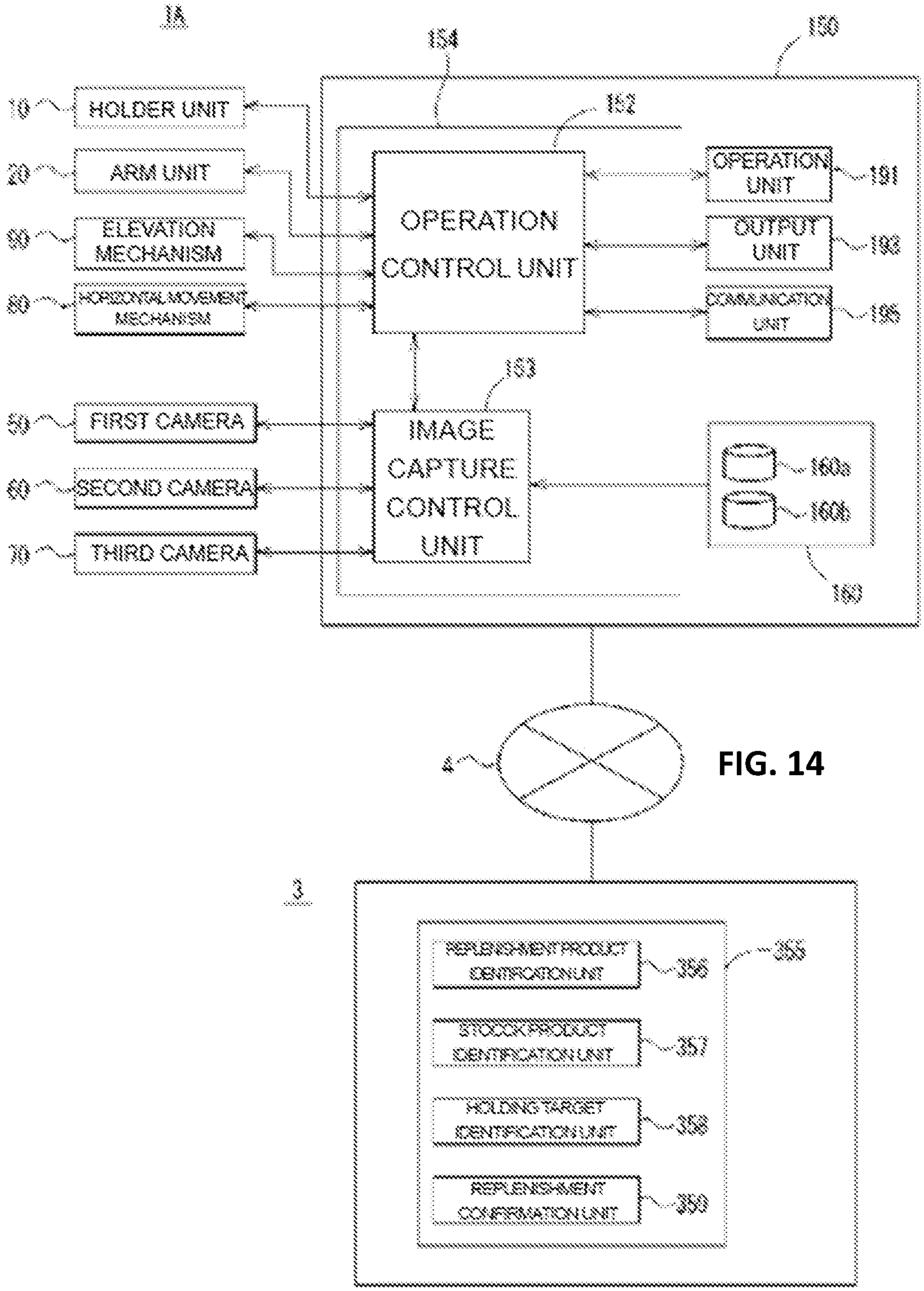
FIG. 14 is a diagram showing structure of a system having the product transfer apparatus and a management apparatus.

FIG. 14 shows structure of a system having a product transfer apparatus 1A and a management apparatus 3. The product transfer apparatus 1A basically has the same structure as the product transfer apparatus 1 shown in FIG. 9, but the data processing unit 155 is omitted in a control unit 154.

The management apparatus 3 is capable of communicating with the product transfer apparatus 1A through a network 4. The management apparatus 3 is a computer having a CPU, a memory, etc., and has a data processing unit 355, a receiver unit (not shown), and a transmitter unit (not shown).

The data processing unit 355 is a functional unit corresponding to the data processing unit 155 in FIG. 9, and has a replenishment product identification unit 356, a stock product identification unit 357, a holding target identification unit 358, and a replenishment confirmation unit 359. The function of each unit is basically the same as those described for the data processing unit 155, and thus, the description such functions will not be given repeatedly.

The management apparatus 3 analyzes the received capture image data in the data processing unit 355, and determines, for example, which product 700 needs to be replenished in the product display shelf 410, and which product 700 should be replenished in the stock shelf 420. The results of the process at the management apparatus 3 are transmitted to the product transfer apparatus 1A through a transmitter unit (not shown) and the network 4. In a specific example, a control signal to control the arm unit 20 to move the holder unit 10 to the position of the product 700 identified by the stock product identification unit 357 is sent to the product transfer apparatus 1A through the transmitter unit (not shown) and the network 4.

Based on the transmitted control signal, the product transfer apparatus 1A operates the operation control unit 152 to operate the arm unit 20 and the holder unit 10. Thus, the present disclosure is applicable to structure in which the product transfer apparatus 1A in a store is connected to the external management apparatus 3 through the network 4, and various computational processes are performed on the part of the management apparatus 3.

MODIFICATIONS

Hereinafter, several modified embodiments of the present disclosure will be described below. In the "modified embodiment 1", a single camera is provided instead of the first camera and the second camera. The product transfer apparatus in the "modified embodiment 2" performs the operation of placing products while avoiding a pillar of the product display shelf. The product transfer apparatus in the "modified embodiment 3" performs the operation of holding the product without detecting a predetermined holding point of the product. The modified embodiments will be described one by one.

Modification 1. Structure in which a Single Camera is Provided Instead of the First Camera and the Second Camera The above embodiments have been described in connection with an example where two cameras, i.e., the first camera 50 and the second camera 60, are provided on both the left and right sides of the arm unit 20. In another embodiment of the present disclosure, a single camera may be configured to capture images of the product display shelf 410 and the stock shelf 420. The single camera may be provided on either the arm unit 20 or the holder unit 10.

As the single camera in this case, for example, a wide-angle camera capable of capturing images of both of the product display shelf 410 and the stock shelf 420 without moving the arm unit 20 or the holder unit 10 may be utilized. Specifically, a 360-degree camera capable of capturing images of the full range around the camera may be utilized.

Although image capturing of the product display shelf 410 and image capturing of the stock shelf 420 are performed by a single camera instead of the first camera 50 and the second camera 60, the obtained capture image data can be analyzed in the same manner as in the case of the above embodiment. For example, the single camera may be used to capture images of the product display shelf 410 to obtain capture image data, and then in step S2 (see FIG. 10), etc., it is determined whether or not products need to be replenished, etc., and then, the same camera may also be used to capture images of the stock shelf 420 to obtain capture image data, and then in step S5, etc., it is determined whether or not there are any target products. It is a matter of course that image capturing of the product display shelf 410 and image capturing of the stock shelf 420 may be performed at the same time.

Also using the single camera of this type, it is possible to capture images of the product display shelf 410 and the stock shelf 420 without moving the arm unit 20. Therefore, image capturing of the product display shelf 410 and image capturing of the stock shelf 420 can be performed in a short time with high efficiency.

In other camera layouts, for example, one of the first camera 50 and the second camera 60 may be located on the side surface of the arm unit 20, etc. and the other of the first camera 50 and the second camera 60 may be located on the top surface or the bottom surface of the arm unit 20, etc. In such structure, it is basically impossible for two cameras to simultaneously capture images of the product display shelf 410 and the stock shelf 420. However, an embodiment of the present disclosure may adopt control where one of the cameras captures images of one of the product display shelf 410 and the stock shelf 420, and thereafter, for example, the arm unit 20 is rotated by 90 degrees (about the axis of the arm unit) to capture images of the other of the product display shelf 410 and the stock shelf 420 by the other camera.

Figure 16:
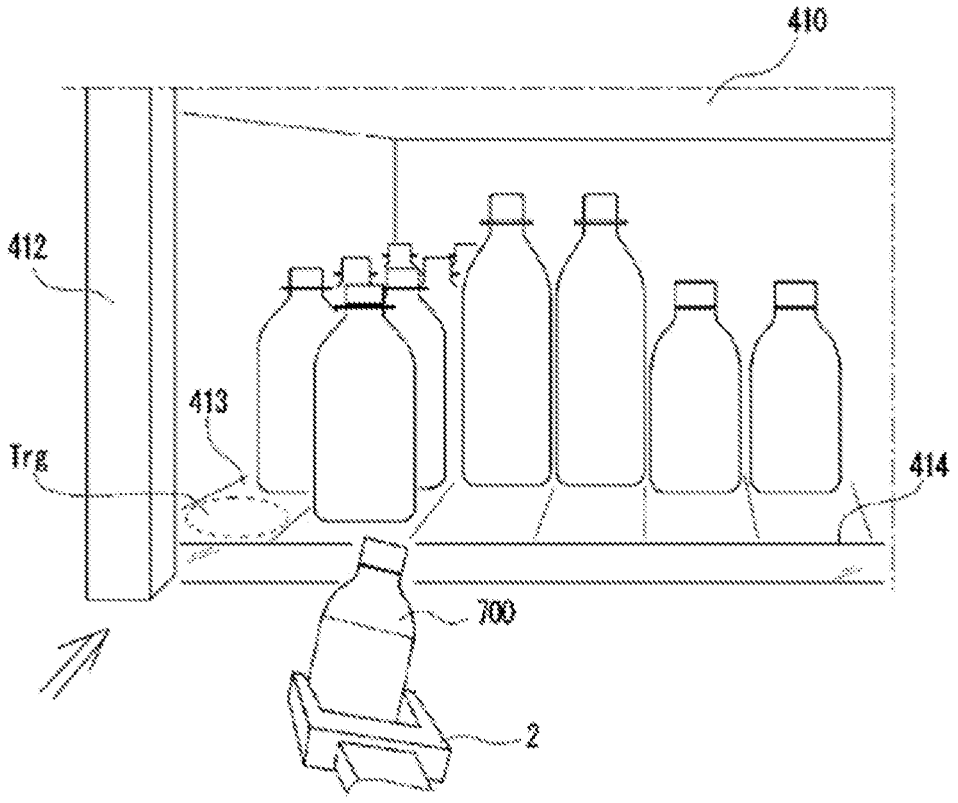
FIG. 16 is a view illustrating operation of placing a product while avoiding a pillar of the product display shelf, and showing the product display shelf viewed from the back side.

Modification 2. A Product Transfer Apparatus which Performs Operation to Place a Product while Avoiding a Pillar of the Product Display Shelf FIG. 16 is a view illustrating operation of placing a product while avoiding a pillar of the product display shelf, and showing the product display shelf viewed from the back side. In FIG. 16, there is a pillar 412, which is obstructive structure, at a front corner of a lane 413 at the end of the product display shelf 410 (the lefthand corner in the drawing).

In the layout shown in FIG. 16, even if the product transfer apparatus 1 attempts to place the product 700 on a placement location Trg by moving the robot arm 2 forward in a straight direction (see an arrow in the drawing) to the product display shelf 410, the product 700 or the robot arm 2 contacts the pillar 412, and the product transfer apparatus 1 cannot place the product 700. In this case, the product transfer apparatus 1 operates the robot arm 2 as follows, for example, to move the product while avoiding the pillar 412.

Figure 17:
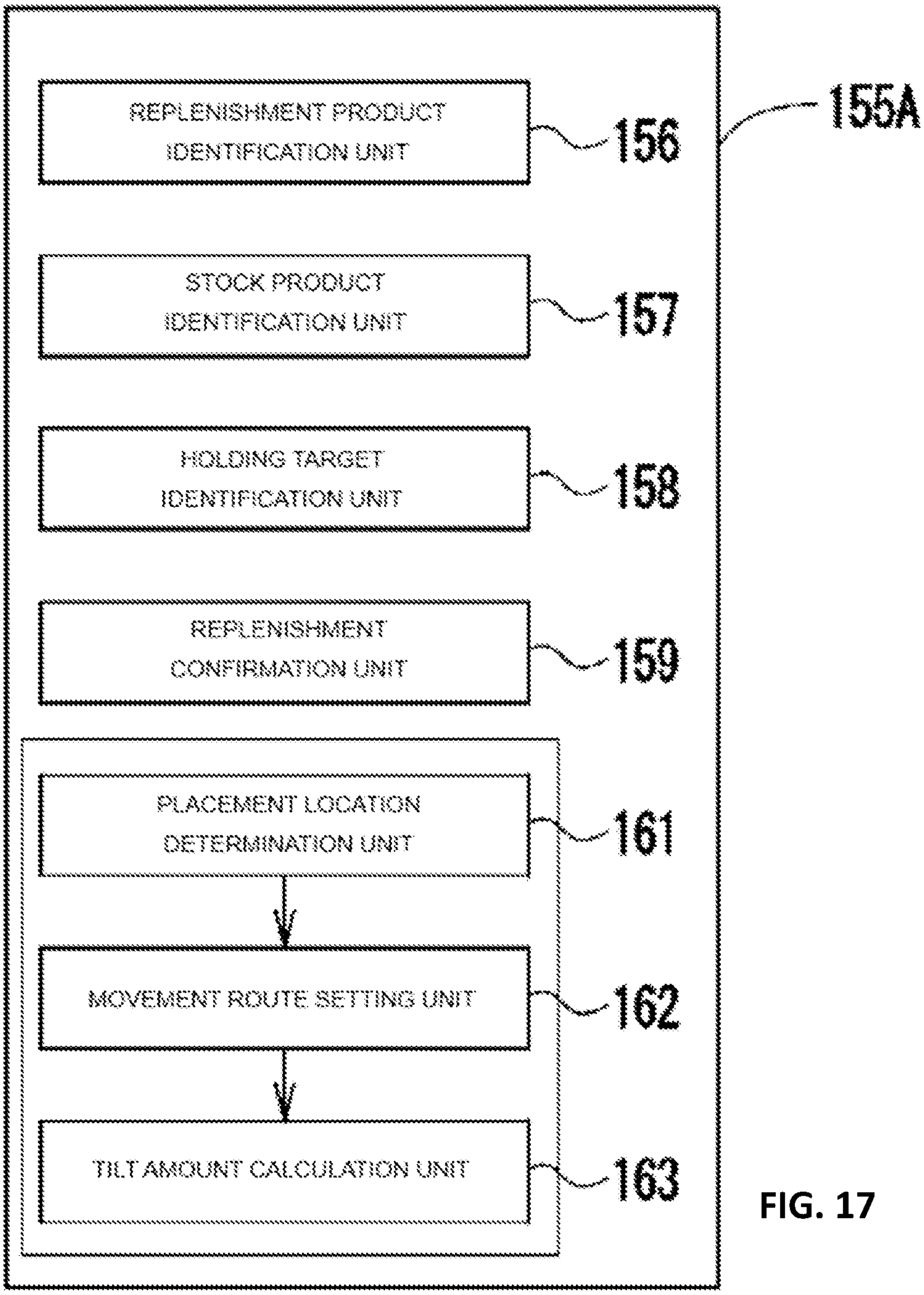
FIG. 17 is a block diagram showing structure of a data processing unit according to one aspect, in a modified example of the product transfer apparatus.

FIG. 17 is a block diagram showing structure of a data processing unit 155A of a control unit of the product transfer apparatus 1. In FIG. 17, part of structure of the data processing unit 155A in the block diagram of FIG. 9 has been changed. Other structure of the product transfer apparatus 1 is identical to that in FIG. 9. Therefore, description of the identical structure will not be given repeatedly.

The data processing unit 155A includes, a placement location determination unit 161, a movement route setting unit 162, and a tilt amount calculation unit 163, in addition to the replenishment product identification unit 156, the stock product identification unit 157, the holding target identification unit 158, and the replenishment confirmation unit 159 like the data processing unit 155 shown in FIG. 9.

The placement location determination unit 161 identifies the position of a placement location Trg, which is a position where the product 700 should be placed. The placement location Trg can be identified, for example, by a method like the method described in the above-described embodiments. The placement location determination unit 161 also determines whether or not the identified placement location Trg corresponds to a predetermined placement location (predetermined placement location where the product must be placed by avoiding the obstructive structure) stored beforehand in the memory unit 160.

The movement route setting unit 162 sets a movement route of the robot arm 2. The tilt amount calculation unit 163 determines whether or not the product 700 needs to be tilted at the time of moving the product 700 to the placement location Trg, and, if the product 700 needs to be tilted, calculates the tilt amount, etc. More detailed description of functions of the placement location determination unit 161, the movement route setting unit 162, and the tilt amount calculation unit 163 will be given later in detail in the description of an operation sequence according to a flow chart in FIG. 19.

(Operation Sequence)

Figure 18:
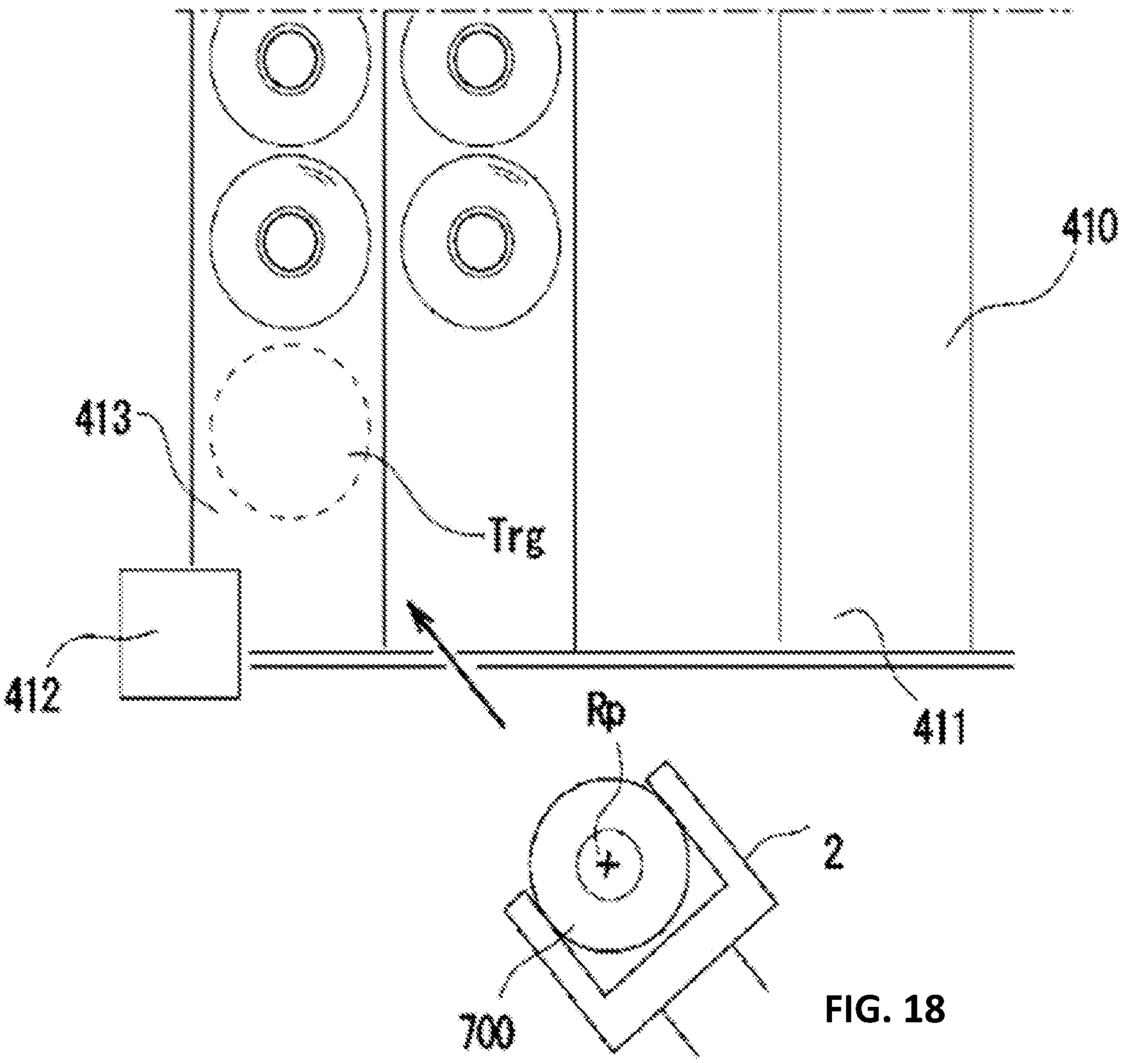
FIG. 18 is a view showing a state of placing a product by a robot arm, viewed from above.
Figure 19:
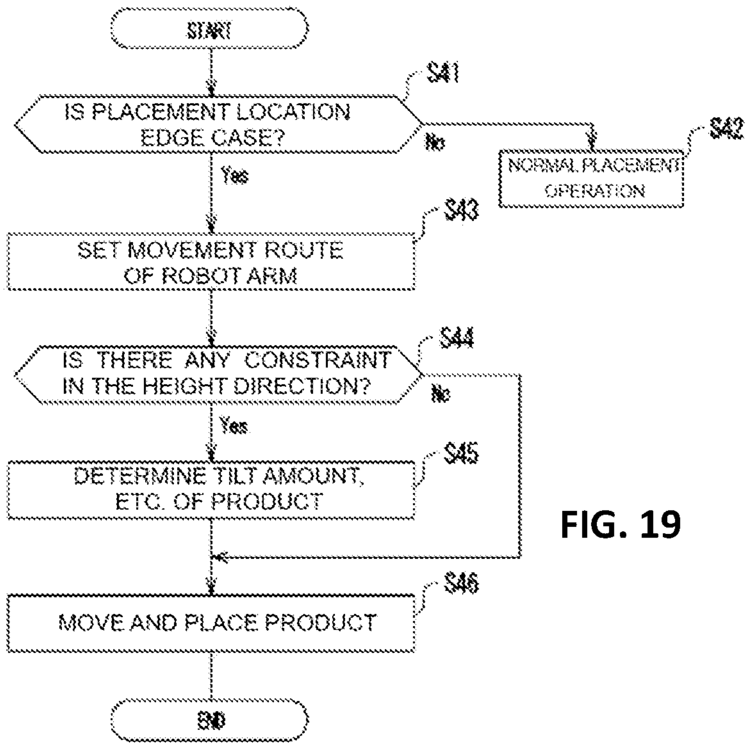
FIG. 19 is a flow chart of an example of operation in which a product transfer apparatus places a product on a product display shelf while avoiding a pillar of the product display shelf.

FIG. 18 is a view showing a state of placing a product by the robot arm, viewed from above. FIG. 19 is a flow chart of an example of operation in which the product transfer apparatus places products on the product display shelf while avoiding a pillar of the product display shelf. In the following explanation, the placement location where the product 700 cannot be placed by moving the robot arm 2 in a straightforward direction as shown in FIG. 16 is also referred to as the "edge case".

In the following description, it is assumed that the memory unit 160 stores information about the location of the edge case beforehand, i.e., information about a predetermined placement location where the product 700 cannot be placed from the straightforward direction due to the presence of obstructive structure such as the pillar 412 and the product must be placed by avoiding the obstructive structure, beforehand. A predetermined memory device (not shown) connected to the product transfer apparatus 1 through a network may store the information about the location of the edge case.

Firstly, in step S41, it is determined whether or not the placement location Trg is the edge case. Specifically, firstly, the placement location determination unit 161 identifies the position of the placement location Trg, which is the location where the product 700 should be placed. The placement location Trg can be identified by the method described in the above described embodiment.

Next, the placement location determination unit 161 refers to the information about the predetermined placement location, stored in the memory unit 160, where the products need to be placed by avoiding the obstructive structure, and determines whether or not the placement location Trg corresponds to the predetermined placement location stored in the memory unit 160.

In step S41, if it is determined that the placement location Trg is not a predetermined placement location stored in the memory unit 160 (i.e., the placement location Trg is not the edge case), in step S42, the operation control unit 152 operates the robot arm 2 to perform normal placement operation.

In step S41, if it is determined that the placement location Trg is a predetermined placement location stored in the memory unit 160 (i.e., the placement location Trg is the edge case), in step S43, the movement route setting unit 162 sets the movement route of the robot arm 2 to move the product 700 to the placement location Trg while avoiding the pillar 412.

For example, the movement route setting unit 162 refers to data indicating the shape or position of the pillar 412, which is obstructive structure, stored in the memory unit 160, and, as shown in FIG. 18, the movement route setting unit 162 sets a route where a reference point Rp set at the center of the bottom surface of the product 700 moves toward the center of the placement location Trg while avoiding contact of the product 700 and the robot arm 2 with the pillar 412.

Then, in step S44, it is determined whether or not there is a constraint in the height direction. Though this determination may be made as step S43, the determination is described herein as a separate step. The "constraint in the height direction" herein means a constraint where, at the time of moving the product 700 to the placement location Trg by the robot arm 2, if the product 700 is kept: facing vertically, the product 700 contacts a predetermined structural part of the product display shelf 410, and as a result, movement of the product 700 to the placement location Trg is hindered.

For example, as shown in FIG. 16, in the case where a partition plate 414 having a predetermined height is provided on the front side of the product display shelf 410, and the product 700 cannot move into the product display shelf 410 without tilting the product 700, there is a "constraint in the height direction".

In step S44, specifically, the tilt amount calculation unit 163 determines whether or not the product 700 needs to be tilted at least partially on a route on which the product 700 moves. Based on the information indicating the shape of the product display shelf 410 and the information indicating the height of the target product 700 stored beforehand in the memory unit 160, if the height dimension of the product 700 is more than the height dimension of a path on which the product moves, the tilt amount calculation unit 163 determines that there is a "constraint in the height direction".

In step S44, if it is determined that there is a constraint in the height direction, then, the tilt amount calculation unit 163 calculates, in step S45, the tilt amount, etc., of the product 700. The tilt amount calculation unit 163 calculates the amount of tilt of the product 700 or the amount of tilt of the product 700 and the amount of lift of the product 700 required to allow the product 700 to pass through the location where there is a constraint in the height direction. The "lift amount" is the amount by which the robot arm 2 lifts the product 700 from the top surface of the shelf plate 411 of the product display shelf 410.

After the movement route of the product 700 have been set and the tilt amount, etc. of the product 700 haven been calculated in the process described above, in step S46, the operation control unit 152 operates the robot arm 2 according to the information indicating the movement route and tilt amount, etc. of the product 700 to move the product 700 to the placement location Trg, and place the product 700 at the placement location Trg.

In step S44, if it is determined that there is no constraint in the height direction, the operation control unit 152 operates the robot arm 2 to move and place the product 700 according to the information of the movement route set in step S43.

By the series of operations described above, even if the product display shelf 410 has the pillar 412 which is obstructive structure as shown in FIGS. 16 and 18, the product transfer apparatus 1 can operate the robot arm 2 to automatically place the product 700 at the placement location Trg.

In the case where the robot arm 2 holds the product 700 in a tilted state, and then releases the product 700, there is a risk that the product 700 may fall over. Therefore, it is preferable for the robot arm 2 to orient the product 700 in a vertical direction (the direction in which the bottom surface becomes horizontal), and then, release the product 700.

Although the above example shows the pillar 412 as obstructive structure, the obstructive structure includes, for example, a structural part where the space between the adjacent shelf plates of the product display shelf 410 is partially narrowed and the product 700 needs to be tilted to move the product 700 into the product display shelf 410.

Although the above example shows moving products to the product display shelf, the product transfer apparatus may be used to move a given product to any shelf or placement location other than the product display shelf. Even at such a shelf or movement location, if there is obstructive structure in the route where the product moves and the product needs to move around the obstructive structure, the control operation of the product transfer apparatus described above can be used.

The contents explained above can be represented as the invention for a method of controlling a product transfer apparatus and the invention for the product transfer apparatus, as follows:

(1) A method of controlling a product transfer apparatus for moving a product to a product display shelf by a robot arm, the method including the steps of:

identifying a placement location where the product should be placed;

referring to information about predetermined placement location where the product needs to be placed while avoiding obstructive structure, stored in a memory unit, and in the case where the placement location identified in the above step is a certain placement location, setting a movement route for moving the product while avoiding the obstructive structure; and operating the robot arm in accordance with the set movement route, and moving the product to the product display shelf.

(2) In the step of setting the movement route, the movement route may be set with reference to data indicating the shape or position of the obstructive structure stored in the memory unit.

(3) The method of controlling the product transfer apparatus may further include the steps of:

in a case of moving the product by the robot arm, determining whether or not the product needs to be tilted and moved due to constraints in the height direction in the product display shelf at least in part on the route where the product moves; and in a case where the product needs to be tilted for movement, calculating a tilt amount of the product.

(4) In the step of calculating the tilt amount of the product, whether or not the product needs to be tilted may be determined by comparing a height dimension of the route where the product moves and a height dimension of the target product.

(5) A product transfer apparatus for moving a product to a product display shelf by a robot arm, the product transfer apparatus including:

a placement location determination unit for identifying a placement location where the product should be placed;

a movement route setting unit for referring to information about predetermined placement location where the product needs to be placed while avoiding obstructive structure, stored in a memory unit, and in the case where the placement location identified in the above step is a certain placement location, setting a movement route for moving the product while avoiding the obstructive structure; and an operation control unit for operating the robot arm in accordance with the set movement route, and moving the product to the product display shelf.

Figure 20:
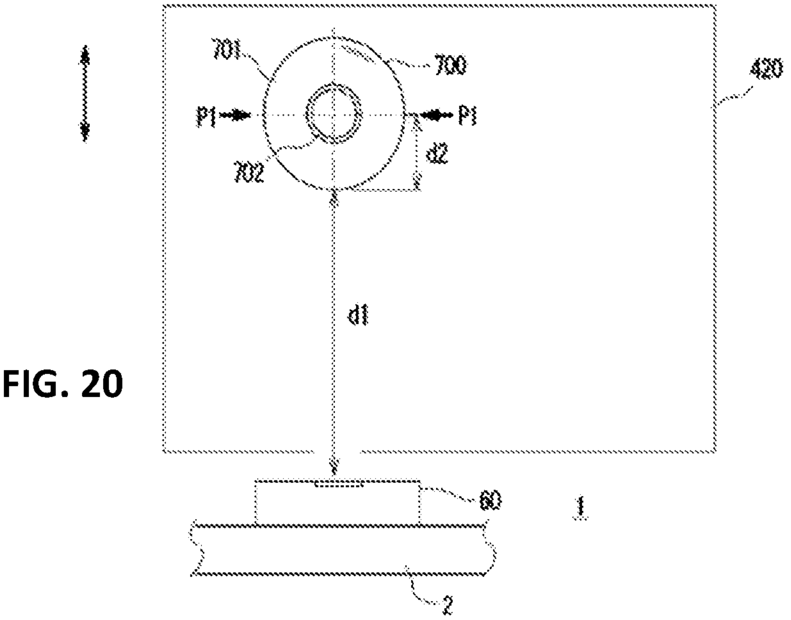
FIG. 20 is a view illustrating operation of holding a product without detecting a predetermined holding point of a product, and showing the display shelf and the product viewed from above.

Modification 3. Product Transfer Apparatus which Performs Operation of Holding a Product without Detecting any Predetermined Holding Point of the Product FIG. 20 is a view illustrating operation of holding a product without detecting any predetermined holding point of the product, and showing the display shelf and the product viewed from above. In the following description, as described in the first embodiment, structure having the second camera 60 has an image capture element for generating a capture image and a depth sensor for generating data of the depth to a target object will be given as an example.

In FIG. 20, "front" is the side of the stock shelf 420 which is closer to the product transfer apparatus 1, and "back" is the side of the stock shelf 420 which is farther from the product transfer apparatus 1. In FIG. 20, the product 700 is positioned relatively far from the product transfer apparatus 1 on the stock shelf 420. When the product 700 has a cap member 702 and a container body 701, the depth sensor of the product transfer apparatus 1 may not be able to accurately measure the distance from the depth sensor to the cap member 702.

This is because when the distance from the depth sensor to the product 700 is far, the size of the cap member 702, which is the detection target, becomes smaller in the image captured by the image capture element of the second camera 60, and it becomes difficult to identify the position of the target to be measured by the depth sensor. In such a case, the product transfer apparatus 1 determines the target position of holding the product 700, for example, by the following process.

Figure 21:
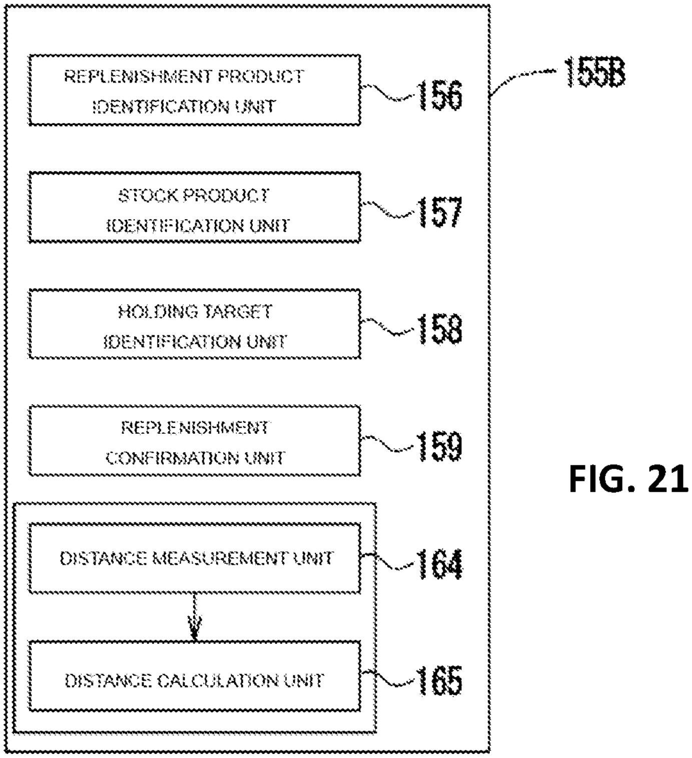
FIG. 21 is a block diagram showing structure of a data processing unit according to another aspect, in a modified embodiment of the product transfer apparatus.

FIG. 21 is a block diagram showing structure of a data processing unit 155B according to another aspect, in a modified embodiment of the product transfer apparatus 1. The data processing unit 155B in FIG. 21 is a partially modified version of the data processing unit 155 in the block diagram of FIG. 9. The other structure of the product transfer apparatus 1 is identical to that shown in FIG. 9. Therefore, description of such structure will not be given repeatedly.

The data processing unit 155B has a distance measurement unit 164 and a distance calculation unit 165 in addition to the replenishment product identification unit 156, the stock product identification unit 157, the holding target identification unit 158, and the replenishment confirmation unit 159 as in the case of the data processing unit 155 shown in FIG. 9.

The distance measurement unit 164 refers to the image data of the product 700 generated by the image capture element of the second camera 60, and if the size of the cap member 702 in the image is not more than a predetermined size, the distance measurement unit 164 measures the distance d1 from the depth sensor as a distance detection device, to the container body 701 of the product 700.

The distance calculation unit 165 calculates a distance d2 of half the length of the container body 701 in cross section of the container body 701, based on data indicating the size of the container body 701 in cross section of the product 700. The distance calculation unit 165 calculates the distance from a predetermined reference point, which is the position of the depth sensor, to the holding position P1 of the product 700 based on data of the distance d1 and the distance d2. The detailed functions of the distance measurement unit 164 and the distance calculation unit 165 will be described later in the description of the operation sequence according to a flow chart in FIG. 22.

(Operation Sequence)

Firstly, in step S51, it is determined whether or not it is necessary to measure the distance to the holding point other than the predetermined holding point near the cap member 702. Specifically, based on image data obtained by image capturing of the product 700 placed on the stock shelf 420, if the size of the cap member 702 in the image is not more than a predetermined size, the distance measurement unit 164 determines that the distance to the holding position P1 (see FIG. 20) other than the holding point near the cap member 702 needs to be measured.

The reason of making such determination is that, if the size of the cap member 702 in the image is not more than a predetermined size, the distance from the depth sensor to the product 700 is far, and measurement may not be carried out with high accuracy by measuring the depth data based on the cap member 702.

In step S51, if the determination is "No" (if it is determined that there is no need to measure the distance to the holding position P1 other than the holding position near the cap member 702), in step S52, the operation control unit 152 operates the robot arm 2 in a normal holding operation similar to the holding operation in the embodiments described above to hold the holding position P1 near the cap member 702, which is the predetermined holding point of the product.

On the other hand, in step S51, if determination is "No" (if it is determined that it is necessary to measure the distance to the holding position P1 other than the holding position near the cap member 702), in step S53, the distance measurement unit 164 measures the distance d1 from the depth sensor to the container body 701 of the product 700. More specifically, the distance measurement unit 164 measures the distance d1, which is the shortest distance from the depth sensor to the container body 701 of the product 700.

Next, in step S54, the distance calculation unit 165 refers to data indicating the size of the product 700 stored in the memory unit 160. In the case where the container body of the product 700 has a circular shape in cross section as shown in FIG. 19, the "data indicating the size of the product" is data indicating the dimension of the "diameter" of the container body 701.

Next, in step S55, the distance calculation unit 165 calculates the distance to the holding position P1 of the product 700. Specifically, the distance calculation unit 165 calculates the distance to the holding position P1 by adding the distance d2 which is half the diameter of the product 700 to the distance d1 to the container body 701. That is, the distance to the holding position P1 is "d1+d2".

Next, in step S56, the operation control unit 152 operates the robot arm 2 based on the data of the distance "d1+d2" to the holding position P1 calculated by the distance calculation unit 165, holds the product 700 on the stock shelf 420, and moves the held product 700 to the product display shelf 410.

Even in the case where the product 700 is located relatively far from the second camera 60 on the stock shelf 420, and it is difficult to measure the depth data to the cap member 702, by the series of processes described above, based on the distance d1 to the container body 701 of the product 700 and the information indicating the size of the product 700 stored in the memory unit 160 beforehand, the product transfer apparatus 1 can calculate the distance to the holding position P1 other than the position near the cap member 702. Thus, it becomes possible for the product transfer apparatus 1 to suitably hold the target product 700 with the robot arm 2.

Although FIG. 20 illustrates the example where the second camera 60 capture images of the product 700 from a position directly opposite the product 700 on the stock shelf 420, the second camera 60 may capture images of the product 700 obliquely from a location which is displaced from the position in FIG. 20 by a predetermined distance in the left or right direction.

Figure 22:
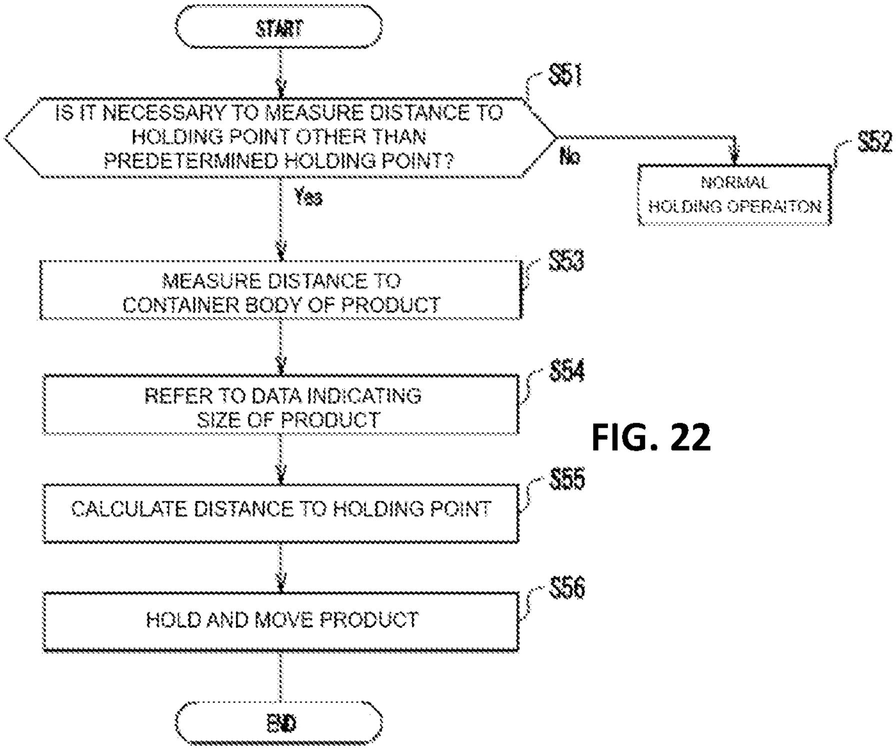
FIG. 22 is a flow chart showing operation of holding a product without detecting a predetermined holding point of the product.

The flow chart in FIG. 22 illustrates an example where the processes from step S53 to step S56 are performed according to the determination result as to whether or not the size of the cap member 702 in the image obtained by image capturing of the product 700 is not more than a predetermined size. However, the product transfer apparatus 1 may perform the process from step S53 to step S56, for example, if the position of the placement location Trg where the product 700 should be placed is distant from the depth sensor by more than a predetermined reference value.

Figure 23:
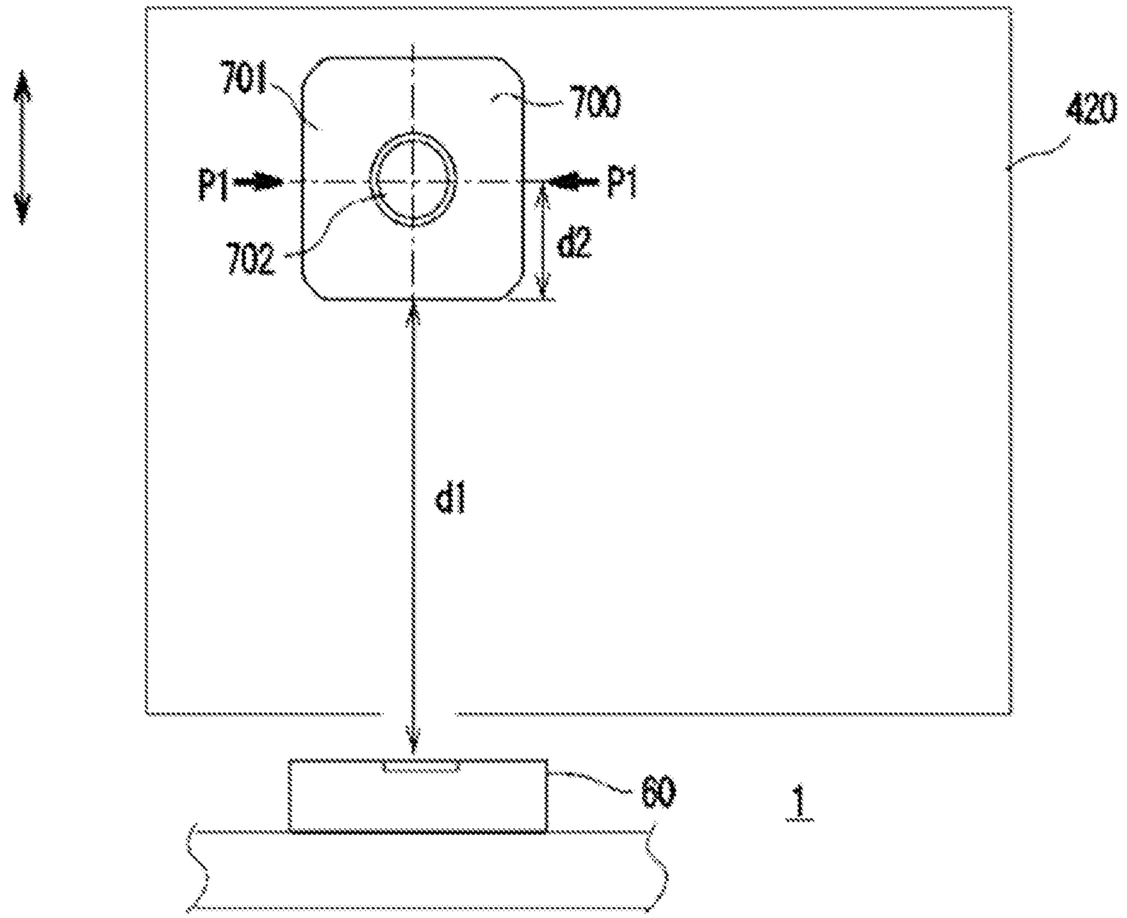
FIG. 23 is a view showing operation of holding a product having a rectangular shape in cross section, without detecting a predetermined holding point of the product.

FIG. 23 illustrates operation of holding a product 700 having a rectangular cross section without detecting any predetermined holding point of the product 700. In FIG. 20, although the product 700 has a circular shape in cross section, as shown in FIG. 23, the product 700 may also have a rectangular shape in cross section. In this case, the distance calculation unit 165 may determine the distance to the holding position P1 by adding a distance d2 of half the length of the container body 701 in the direction parallel to a reference line RL connecting the depth sensor and the product 700 to the distance d1 from the depth sensor of the second camera 60 to the container body 701 of the product 700.

The contents explained above can be represented as the invention for the control method of a product transfer apparatus and the invention for the product transfer apparatus, as follows:

(1) A method of controlling a product transfer apparatus for holding a product having a cap member and a container body by a robot arm, and moving the product from the stock shelf to the product display shelf, the method including the steps of:

- referring to image data as data of an image of the product disposed on a stock shelf, and in a case where the size of the cap member shown in the image is not more than a predetermined size, measuring a distance from a distance detection device to the container body of the product; and
- calculating a distance of half the length of the container body in a direction parallel to a reference line connecting the distance detection device and the product, in the cross section of the container body, based on data indicating the size of the container body in the cross section of the product; and
- determining the distance to the holding position of the product by summing the distance from the distance detection device to the container body of the product and the distance of half the length of the container body.

(2) In the method of controlling the product transfer apparatus, the product may have a circular shape in cross section of the container body, and half the distance of the container body may be half the diameter of the container body.

(3) A product transfer apparatus for holding a product having a cap member and a container body by a robot arm, and moving the product from a stock shelf to a product display shelf, the product transfer apparatus including a distance measurement unit for referring to image data as data of an image of the product disposed on a stock shelf, and in a case where the size of the cap member shown in the image is not more than a predetermined size, measuring a distance from a distance detection device to the container body of the product; and a distance calculation unit for calculating a distance of half the length of the container body in a direction parallel to a reference line connecting the distance detection device and the product, in cross section of the container body, based on data indicating the size of the container body in cross section of the product and determining the distance to the holding position of the product by summing the distance from the distance detection device to the container body of the product and the distance of half the length of the container body.

Although the present invention has been described using the embodiments, the technical scope of the present invention is not limited to the scope described in the above embodiments, and various modifications and changes can be made within the scope of the gist of the present invention. For example, all or part of the apparatus, in any unit, can be configured to be functionally or physically distributed or integrated. Further, any new form of embodiments derived from any combination of a plurality of embodiments are also encompassed within the embodiments of the present disclosure. The effects of the new form of embodiments derived from combination of embodiments have the effects of the original embodiments as well. It should be understood by those skilled in the art that the disclosure of the invention in the above embodiments as a method of executing a predetermined process by an apparatus and a computer is also disclosed as the invention of a program for operating the apparatus and the computer.

The invention claimed is:

1. A product transfer apparatus configured to move a stock product placed on a stock shelf in a first orientation to a display shelf which is different from the stock shelf, the product transfer apparatus comprising:

a holder unit configured to hold the stock product;

an arm unit configured to move the holder unit to the stock shelf and the display shelf, wherein the holder unit is at an end of the arm unit;

a first image capture unit positioned on a first side of the arm unit and is configured to capture an image of the display shelf;

a second image capture unit positioned on a second side of the arm unit and is configured to capture an image of the stock shelf, wherein the second side of the arm unit is the side of the arm unit opposite to the first side of the arm unit;

a third image capture unit configured to capture an image of both the display shelf and the stock shelf;

a control unit configured to control operation of the holder unit, the first image capture unit, and the second image capture unit;

wherein the control unit is configured to:

identify a replenishment target product as the stock product required to be replenished to the display shelf, based on display shelf capture image data generated by image capturing of the display shelf by the first image capture unit;

identify a position of the stock product corresponding to the replenishment target product, based on stock shelf capture image data generated by image capturing of the stock shelf by the second image capture unit;

control the holder unit to move the stock product from the stock shelf to the display shelf; and wherein the stock product is moved by the holder unit from the stock shelf to the display shelf while maintaining the stock product in the first orientation.

2. The product transfer apparatus according to claim 1, wherein the first orientation is a vertical orientation.

3. The product transfer apparatus according to claim 2, wherein the third image capture unit is mounted on an elevation mechanism from which the arm unit extends from.

4. The product transfer apparatus according to claim 2, wherein the third image capture unit is rotatable.

5. The product transfer apparatus according to claim 1, wherein the third image capture unit is responsive to a remote input from an operator.

6. A product transfer system comprising:

a product transfer apparatus configured to move a stock product placed on a stock shelf in a first orientation to a display shelf which is different from the stock shelf; and a management apparatus configured to transfer a control signal to the product transfer apparatus through a network;

wWherein the product transfer apparatus comprises:

a holder unit configured to hold the stock product;

an arm unit configured to move the holder unit to the stock shelf and the display shelf, based on a control signal received from the management apparatus, wherein the holder unit is at an end of the arm unit;

a first image capture unit positioned on a first side of the arm unit and configured to generate display shelf capture image data by capturing an image of the display shelf;

a second image capture unit positioned on a second side of the arm unit and configured to generate stock shelf capture image data by capturing an image of the stock shelf, wherein the second side of the arm unit is the side of the arm unit opposite to the first side of the arm unit;

a third image capture unit configured to capture an image of both the display shelf and the stock shelf;

a transfer apparatus communication unit configured to transmit the display capture image data and the stock shelf capture image data to the management apparatus, wherein the management apparatus comprises:

a receiver unit configured to receive the display shelf capture image data and the stock shelf capture image data; and a control unit configured to:

identify a replenishment target product as the stock product required to be replenished to the display shelf, based on the display shelf capture image data generated by image capturing of the display shelf by the first image capture unit; and identify a position of the stock product corresponding to the replenishment target product, based on the stock shelf capture image data generated by image capturing of the stock shelf by the second image capture unit; and a transmitter unit configured to transmit a control signal for controlling the arm unit to the product transfer apparatus, wherein the holder unit is controlled to move to the position of the stock product identified by the control unit, and wherein the stock product is moved by the holder unit from the stock shelf to the display shelf while maintaining the stock product in the first orientation.

7. The product transfer system according to claim 6, wherein the first orientation is a vertical orientation.

8. The product transfer system according to claim 7, wherein the third image unit is mounted on an elevation mechanism from which the arm unit extends from.

9. The product transfer system according to claim 7, wherein the third image capture unit is rotatable.

10. The product transfer apparatus according to claim 6, wherein the third image capture unit is responsive to a remote input from an operator.

11. A method of controlling a product transfer apparatus in a product transfer system comprising a product transfer apparatus configured to move a stock product placed on a stock shelf in a first orientation to a display shelf which is different from the stock shelf, and a management apparatus configured to transmit a control signal to the product transfer apparatus through a network, wherein the product transfer apparatus comprises:

a holder unit configured to hold the stock product;

an arm unit configured to move the holder unit to the stock shelf and the display shelf, based on a control signal received from the management apparatus, wherein the holder unit is at an end of the arm unit;

a first image capture unit positioned on a first side of the arm unit and configured to generate display shelf capture image data by capturing an image of the display shelf;

a second image capture unit positioned on a second side of the arm unit and configured to generate stock shelf capture image data by capturing an image of the stock shelf, wherein the second side of the arm unit is the side of the arm unit opposite to the first side of the arm unit;

a third image capture unit configured to capture an image of both the display shelf and the stock shelf; and a transfer apparatus communication unit configured to transmit the display capture image data and the stock shelf capture image data to the management apparatus, the method comprising:

receiving the display shelf capture image data and the stock shelf capture image data, by the management apparatus;

identifying a replenishment target product as the stock product required to be replenished to the display shelf, based on the display shelf capture image data, by the management apparatus; and identifying a position of the stock product corresponding to the replenishment target product, based on stock shelf capture image data, by the management apparatus;

generating a control signal for controlling the arm unit to move the holder unit to the identified position of the stock product;

transmitting the control signal to the product transfer apparatus, by the management apparatus; and controlling the holder unit to move the stock product from the stock shelf to the display shelf while maintaining the stock product in the first orientation.

12. The method according to claim 11, wherein the first orientation is a vertical orientation.

13. The method according to claim 12, wherein the third image capture unit is mounted on an elevation mechanism from which the arm unit extends from.

14. The method according to claim 13, wherein the third image capture unit is rotatable.

15. The method according to claim 11, wherein the third image capture unit is responsive to a remote input from an operator.

* * * * *